(12) United States Patent
Ikeda et al.

(10) Patent No.: US 11,396,907 B2
(45) Date of Patent: Jul. 26, 2022

(54) THRUST WASHER

(71) Applicant: TPR CO., LTD., Tokyo (JP)

(72) Inventors: Masaki Ikeda, Tokyo (JP); Shuichirou Hamanaka, Tokyo (JP)

(73) Assignee: TPR CO., LTD., Tokyo (JP)

( * ) Notice: Subject to any disclaimer, the term of this patent is extended or adjusted under 35 U.S.C. 154(b) by 0 days.

(21) Appl. No.: 17/416,283

(22) PCT Filed: Dec. 13, 2019

(86) PCT No.: PCT/JP2019/048950
§ 371 (c)(1),
(2) Date: Jun. 18, 2021

(87) PCT Pub. No.: WO2020/129846
PCT Pub. Date: Jun. 25, 2020

(65) Prior Publication Data
US 2022/0056949 A1  Feb. 24, 2022

(30) Foreign Application Priority Data

Dec. 21, 2018 (JP) .............................. JP2018-240316
Dec. 28, 2018 (WO) .................. PCT/JP2018/048553

(51) Int. Cl.
*F16C 17/04* (2006.01)
*F16C 33/10* (2006.01)
*F16C 33/20* (2006.01)

(52) U.S. Cl.
CPC ............ *F16C 17/04* (2013.01); *F16C 17/045* (2013.01); *F16C 17/047* (2013.01);
(Continued)

(58) Field of Classification Search
CPC ...... F16C 17/04; F16C 17/045; F16C 17/047; F16C 33/1065; F16C 33/107;
(Continued)

(56) References Cited

U.S. PATENT DOCUMENTS

| 1,176,833 A | 3/1916 | Kennedy |
| 2,362,667 A | 11/1944 | Schmidt |

(Continued)

FOREIGN PATENT DOCUMENTS

| DE | 19641673 A1 | 4/1998 |
| EP | 3290724 A1 | 3/2018 |

(Continued)

OTHER PUBLICATIONS

International Search Report for PCT/JP2019/048950 (dated Feb. 18, 2020).

(Continued)

*Primary Examiner* — Alan B Waits
(74) *Attorney, Agent, or Firm* — Merchant & Gould P.C.

(57) ABSTRACT

A thrust washer is provided with a ring-shaped portion that surrounds an insertion hole, the thrust washer is provided with a sliding surface and an oil groove configured to allow lubricating oil to flow in, the oil groove is provided with an opening portion configured to allow the lubricating oil to flow in from the insertion hole side in an inner peripheral end side, an outer periphery end side of the ring-shaped portion of at least one of the oil groove is provided with an oil stop wall which is configured to suppress flow of the lubricating oil toward an outer periphery side of the ring-shaped portion, and a sliding area ratio of each of the sliding surfaces to a projection plane in plan view of the ring-shaped portion is provided within a range of from 60% to 85%

16 Claims, 37 Drawing Sheets

(52) U.S. Cl.
CPC ........ *F16C 33/107* (2013.01); *F16C 33/1065* (2013.01); *F16C 33/1075* (2013.01); *F16C 33/203* (2013.01)

(58) Field of Classification Search
CPC .. F16C 33/1075; F16C 33/201; F16C 33/203; F16C 2240/30; F16C 2240/90; F16C 2360/43
See application file for complete search history.

(56) References Cited

U.S. PATENT DOCUMENTS

| | | | |
|---|---|---|---|
| 3,370,897 A | | 2/1968 | Rylatt |
| 4,615,231 A | * | 10/1986 | Takahashi ........... F16H 57/0427 74/467 |
| 5,602,945 A | * | 2/1997 | Davis ................. B02C 2/00 384/368 |
| 6,024,495 A | | 2/2000 | Loos et al. |
| 6,045,266 A | * | 4/2000 | Mitsubori ................ F02C 6/12 384/123 |
| 2010/0178166 A1 | | 7/2010 | Ammann et al. |
| 2013/0334006 A1 | * | 12/2013 | Stern .................... F16C 33/201 192/107 M |
| 2018/0087519 A1 | | 3/2018 | Bischof |

FOREIGN PATENT DOCUMENTS

| | | |
|---|---|---|
| JP | H09-061742 A | 3/1997 |
| JP | H11-170397 A | 6/1999 |
| JP | H11-336750 A | 12/1999 |
| JP | 3084600 B2 | 9/2000 |
| JP | 2005-155894 A | 6/2005 |
| JP | 2006-266373 A | 10/2006 |
| JP | 2007-016931 A | 1/2007 |
| JP | 4370982 B | 11/2009 |
| JP | 5727909 B2 | 6/2015 |
| JP | 2015-152061 A | 8/2015 |
| JP | 2017-009062 A | 1/2017 |
| JP | 2018-087583 A | 6/2018 |

OTHER PUBLICATIONS

Office Action for Japanese Patent Application No. 2019-569513 (dated Jun. 16, 2020).
Office Action for Japanese Patent Application No. 2019-569513 (dated Oct. 13, 2020).
Decision to Grant for Japanese Patent Application No. 2019-569513 (dated Feb. 16, 2021).
Search Report for European Patent Application No. 19900474.8 (dated Dec. 22, 2021).

* cited by examiner

THRUST WASHER

This is a U.S. national stage of application No. PCT/JP2019/048950, filed on Dec. 13, 2019. Priority under 35 U.S.C. § 119(a) and 35 U.S.C. § 365(b) is claimed from Japanese Patent Applications No. 2018-240316, filed on Dec. 21, 2018 and PCT International Application No. PCT/JP2018/048553, filed on Dec. 28, 2018, the disclosure of which is also incorporated herein by reference. To the extent appropriate, a claim of priority is made to each of the above disclosed applications.

TECHNICAL FIELD

The present invention relates to a thrust washer.

BACKGROUND

A thrust washer as described in, for example, Patent Literatures 1 to 4 is mounted in some machine devices such as clutch devices, gear mechanisms, and compressors. A thrust washer as disclosed in Patent Literature 1 has oil grooves formed to extend from an insertion hole toward an outer periphery side. Further, the thrust washer disclosed in Patent Literature 2 has first oil passages communicating with the inner and outer periphery surfaces of the thrust washer and dead-end second oil passages which is opened to the inner periphery surface but not opened to the outer periphery surface.

Still further, a thrust washer as disclosed in Patent Literature 3 has arc-shaped oil feed grooves or V-shaped oil feed grooves. Still further, a thrust washer as disclosed in Patent Literature 4 has a configuration including first oil grooves, second oil grooves, and communicating oil grooves. Each of the first oil grooves and the second oil grooves extends from an inner peripheral edge to an outer peripheral edge. The communicating oil grooves bring the first oil grooves and the second oil grooves into communication with each other.

CITATION LIST

Patent Literature

[PTL 1] JP 4370982 B2
[PTL 2] JP 2007-16931 A
[PTL 3] JP 5727909 B2
[PTL 4] JP 2015-152061 A

SUMMARY OF INVENTION

Technical Problem

Although the thrust washer has an opposing mating member, lubricating oil is interposed between the thrust washer and the mating member. Under such an environment, a lubricating state of the thrust washer is supposed to reside in a mixed lubrication region in a Stribeck chart. Thus, it is considered that a part of the thrust washer is separated from the mating member by an oil film of the lubricating oil, but a part of the thrust washer is in direct contact with the mating member. A specific configuration of the thrust washer, which enables achievement of a reduction in sliding load in the mixed lubrication region described above, has not been found. On the other hand, in recent years, there has been an increasing demand for thrust washers to reduce the sliding load on the sliding surface. Thus, a larger reduction in sliding load than those achieved in the thrust washers as disclosed in Patent Literatures 1 to 4 is demanded.

The present invention has been made in view of the circumstances described above, and has an object to provide a thrust washer, which enables achievement of a reduction in sliding load.

Solution to Problem

In order to solve the above-mentioned problem, according to a first aspect of the present invention, there is provided a thrust washer made of a material containing a resin and provided with a ring-shaped portion that surrounds an insertion hole, the thrust washer is provided with sliding surfaces on a front surface and a back surface of the ring-shaped portion, the sliding surfaces being sliding with another member, and the thrust washer is provided with a oil groove on at least one of the front surface or the back surface, the oil groove being recessing from the sliding surface and being configured to allow lubricating oil to flow in; the oil groove is provided with an opening portion in an inner peripheral end side of the ring-shaped portion, the opening portion being recessed from the sliding surface and configured to allow the lubricating oil to flow in from the insertion hole side; and an outer periphery end side of the ring-shaped portion of at least one of the oil groove is provided with an oil stop wall which is configured to separate the oil groove and an outside of the ring-shaped portion and suppress flow of the lubricating oil flowed into the oil groove toward an outer periphery side of the ring-shaped portion, the position of the oil stop wall in a thickness direction of the thrust washer is the same as that of sliding surface, wherein a sliding area ratio of each of the sliding surfaces to a projection plane in plan view of the ring-shaped portion is provided within a range of from 60% to 85%.

Further, according to another aspect of the present invention, in the above-mentioned invention, at an intersection position where a center line of the oil groove and a middle line in a radial direction of the ring-shaped portion intersect with each other, an inclination angle of a center line of the oil groove with respect to a radial line passing through the intersection position and extending along the radial direction is provided within a range of from 30 degrees to 55 degrees.

Further, according to another aspect of the present invention, in the above-mentioned invention, a dynamic-pressure guiding wall surface is provided being adjacent to the oil groove, the dynamic-pressure guiding wall surface guiding the lubricating oil flowed into the oil groove toward the sliding surface and generating dynamic pressure between the sliding surface and another member.

Further, according to another aspect of the present invention, in the above-mentioned invention, the oil groove preferably is provided with a first oil groove being inclined to one side with respect to a radial direction of the ring-shaped portion and a second oil groove being inclined to another side different from the one side with respect to the radial direction of the ring-shaped portion, and the first oil groove and the second oil groove are preferably connected at the opening portion.

Further, according to another aspect of the present invention, in the above-mentioned invention, each of the first oil groove and the second oil groove preferably has a bottom portion which is most recessed from the sliding surface, each of the first oil groove and the second oil groove is preferably provided with a tapered wall surface being linearly inclined toward the sliding surface on an outer side not surrounded by the first oil groove and the second oil groove, and each of the tapered wall surface is preferably provided to have a width larger than a width of the bottom portion.

Further, according to another aspect of the present invention, in the above-mentioned invention, each of the first oil groove and the second oil groove is provided with a curved wall surface which extends from the bottom portion toward the sliding surface and is curved to have an inflection point.

Further, according to another aspect of the present invention, in the above-mentioned invention, the oil groove is preferably provided with a non-communicating oil groove, separated from the outside of the ring-shaped portion by the oil stop wall and a communicating oil groove communicating with the outside of the ring-shaped portion because of absence of the oil stop wall.

Further, according to another aspect of the present invention, in the above-mentioned invention, the non-communicating oil groove and the communicating oil groove are preferably provided alternately in a circumferential direction of the ring-shaped portion.

Further, according to another aspect of the present invention, in the above-mentioned invention, the communicating oil groove is preferably provided with an adjacent communicating oil groove adjacent to the non-communicating oil groove and an intermediate communicating oil groove located between the non-communicating oil grooves that are separate from each other.

Further, according to another aspect of the present invention, in the above-mentioned invention, the oil groove is preferably provided with a non-communicating oil groove, separated from the outside of the ring-shaped portion by the oil stop wall and a communicating oil grooves communicating with the outside of the ring-shaped portion because of absence of the oil stop wall, and the communicating oil groove is preferably arranged in a region between the opening portions being adjacent to each other in a circumferential direction of the ring-shaped portion without interfering with the first oil groove or the second oil groove.

Further, according to another aspect of the present invention, in the above-mentioned invention, preferably, the non-communicating oil groove has a wide groove portion and a narrow groove portion having a groove width smaller than a width of the wide groove portion, the narrow groove portion is connected to the opening portion, and the wide groove portion is continuous with the narrow groove portion, and is provided on the oil stop wall side.

Further, according to another aspect of the present invention, in the above-mentioned invention, the thrust washer preferably further provided with an intermediate communicating oil groove which communicates with the outside.

Further, according to another aspect of the present invention, in the above-mentioned invention, the thrust washer preferably further includes an oil scooping surface which is configured to guide the lubricating oil to the opening portion is provided on an inner periphery side of the ring-shaped portion, the oil scooping surface is preferably provided in such a manner as to be inclined with respect to an axial direction of the ring-shaped portion, and the opening portion is configured by recessing the oil scooping surface.

Further, according to another aspect of the present invention, in the above-mentioned invention, a height from an inner peripheral end portion of the oil scooping surface to the sliding surface is preferably provided with a dimension two or more times a height from a bottom portion of the oil groove, which is most recessed in the oil groove with respect to the sliding surface, to the sliding surface.

Further, according to another aspect of the present invention, in the above-mentioned invention, the ring-shaped portion preferably provided with an oil introducing groove that is concaved from a radially inner side to a radially outer side of the ring-shaped portion, an inclination angle of a groove bottom portion of the oil introducing grooves with respect to an axial direction of the ring-shaped portion is preferably provided smaller than an inclination angle of the oil scooping surface with respect to the axial direction, and the oil introducing groove and the oil scooping surface preferably have a level difference.

Further, according to another aspect of the present invention, in the above-mentioned invention, at least a part of a boundary wall of the oil introducing groove, which is located between the oil introducing groove and the oil scooping surface, is preferably formed in such a manner as to be inclined with respect to a radial direction of the ring-shaped portion.

Advantageous Effects of Invention

According to the present invention, a thrust washer, which enables achievement of a reduction in sliding load can be provided.

DESCRIPTION OF EMBODIMENT

Now, a resin thrust washer 20 according to one embodiment of the present invention, which corresponds to a thrust washer made of a material containing a resin, and a combined thrust washer 10 using the resin thrust washer 20 are described with reference to the drawings.

1. Overall Configuration of Combined Thrust Washer 10

Figure 1:
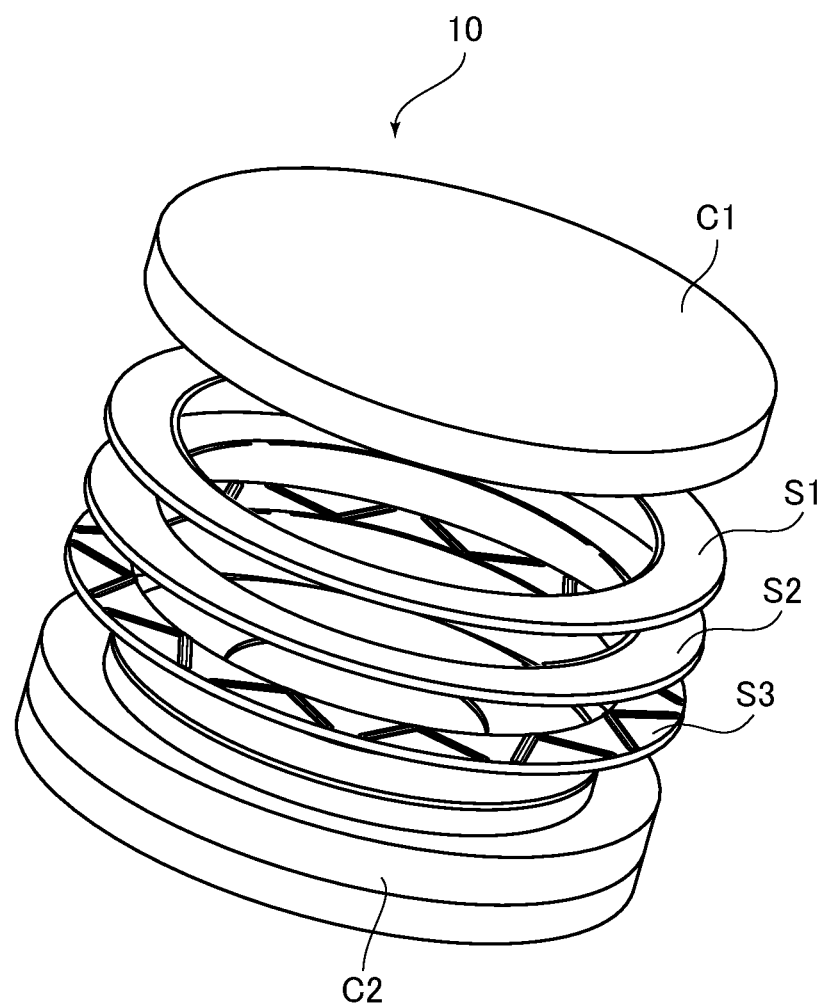
FIG. 1 is a perspective view for illustrating a configuration of a combined thrust washer according to one embodiment of the present invention.

The combined thrust washer 10 is to be assembled into, for example, a transmission device for a vehicle or a compressor for an air-conditioning device for a vehicle. A configuration of the combined thrust washer 10 is illustrated in FIG. 1. FIG. 1 is a perspective view for illustrating the configuration of the combined thrust washer 10.

As illustrated in FIG. 1, the combined thrust washer 10 according to this embodiment has three thrust washers S1, S2, and S3. The combined thrust washer 10 including the three thrust washers S1, S2, and S3 is located between mating members C1 and C2, and is in a state of being subjected to a load applied in a thrust direction.

The combined thrust washer 10 and the mating members C1 and C2 are provided under an environment where lubricating oil is supplied. However, it is estimated from the sliding load measured in various experimental results and the sliding marks on the thrust washers in various experimental results, etc., until the combination thrust washer 10 of this embodiment is reached, a lubricating state in an environment where the combined thrust washer 10 is used is assumed to reside in a mixed lubrication region in a Stribeck chart. Thus, it is supposed that an oil film is interposed between a part of the thrust washer and a corresponding part of the mating member, and a part of the thrust washer and a corresponding part of the mating member are in direct contact with each other.

The thrust washers S1, S2, and S3 described above are configured with at least one resin thrust washer 20 from among (1) a resin thrust washer 20 made of a resin (see FIG. 2 and FIG. 3) and (2) a metal thrust washer made of a metal. More specifically, for the combined thrust washer 10 illustrated in FIG. 1, the following arrangements may be employed. The resin thrust washers 20 may be arranged on the mating member C1 side and the mating member C2 side, and the metal thrust washer may be arranged in the middle. In another arrangement, the resin thrust washer 20 may be arranged only on the mating member C1 side, and the metal thrust washers may be arranged as the other thrust washers. In still another arrangement, the resin thrust washer 20 may be arranged only on the mating member C2 side, and the metal thrust washers may be arranged as the other thrust washers. In still another arrangement, the metal thrust washer may be arranged only on the mating member C1 side, and the resin thrust washers 20 may be arranged as the two other thrust washers. In still another arrangement, the metal thrust washer may be arranged only on the mating member C2 side, and the resin thrust washes 20 may be arranged as the two other thrust washers. In still another arrangement, the metal thrust washers may be arranged on both of the mating member C1 side and the mating member C2 side, and the resin thrust washer 20 may be arranged in the middle. Further, all the three thrust washers S1, S2, and S3 described above may be the resin thrust washers 20.

2. Configuration of Resin Thrust Washer 20

Figure 2:
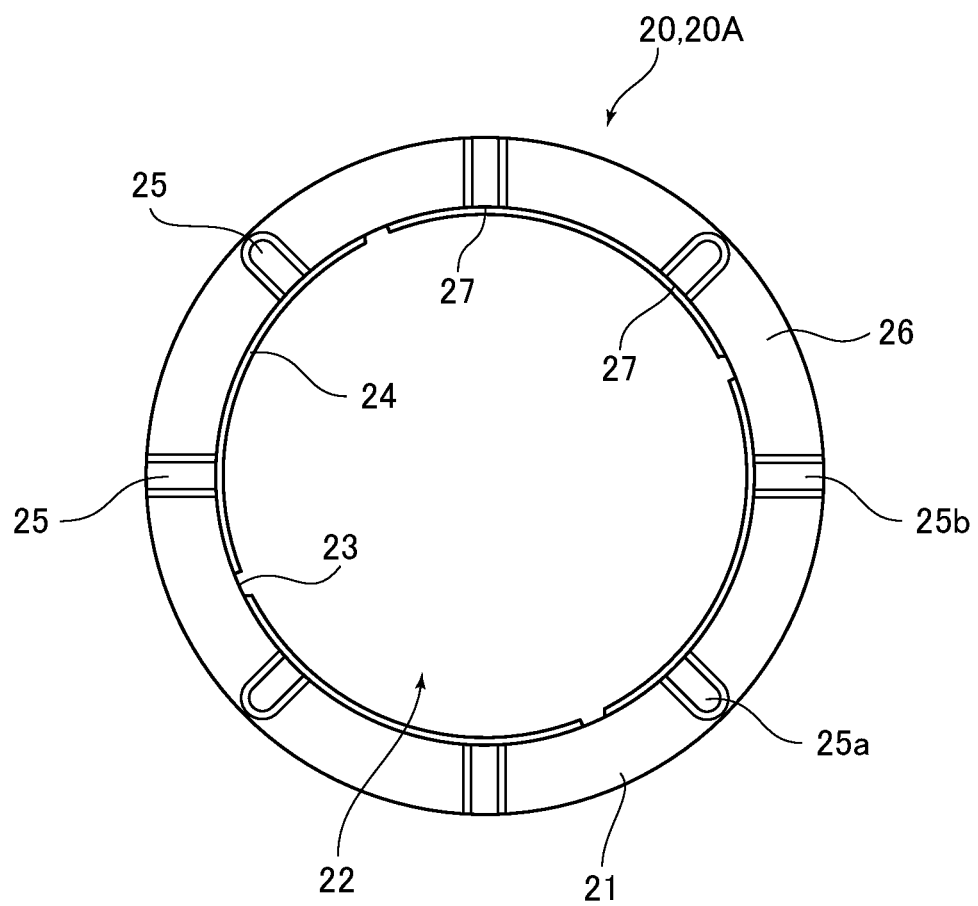
FIG. 2 is a plan view for illustrating a configuration of a resin thrust washer for constituting the combined thrust washer illustrated in FIG. 1, in which oil grooves include non-communicating oil grooves and communicating oil grooves.
Figure 3:
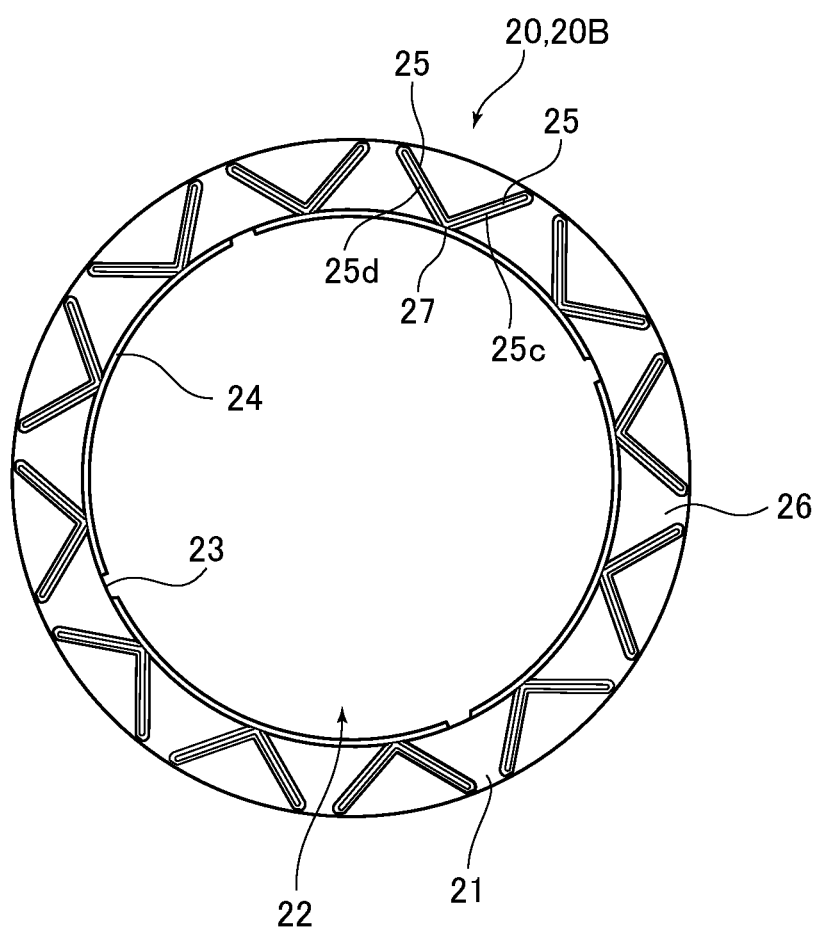
FIG. 3 is a plan view for illustrating the configuration of the resin thrust washer for constituting the combined thrust washer illustrated in FIG. 1, in which two oil grooves having different inclination angles are connected at an opening portion.

First, a configuration of the resin thrust washer 20 for constituting the combined thrust washer 10 is described. FIG. 2 is a plan view for illustrating a configuration of the resin thrust washer 20 for constituting the combined thrust washer 10 illustrated in FIG. 1, in which oil grooves 25 include non-communicating oil grooves 25a and communicating oil grooves 25b. Further, FIG. 3 is a plan view for illustrating a configuration of the resin thrust washer 20 for constituting the combined thrust washer 10 illustrated in FIG. 1, in which two oil grooves 25 having different inclination angles are connected to each other at an opening portion 27. In the configuration illustrated in FIG. 3, two oil grooves 25 having different inclination angles are connected to each other at the opening portion 27. As a result, the oil grooves 25 have a substantially V shaped shape as a whole.

In the following description, the resin thrust washer 20 in which one oil groove 25 is not connected to another oil grooves 25 so as not to form a substantially V shape as illustrated in FIG. 2 is referred to as "resin thrust washer 20A". Further, the resin thrust washer 20 having the oil grooves 25 that are connected in such a manner as to form a substantially V shape as illustrated in FIG. 3 is referred to as "resin thrust washer 20B". However, when the resin thrust washer 20A and the resin thrust washer 20B are not required to be distinguished from each other, the resin thrust washers 20A and 20B are referred to simply as "resin thrust washers 20".

The resin thrust washer 20 is made of any one material of (1) a resin base material alone, (2) a mixture of a resin base material with a fibrous material, (3) a mixture of a resin base material with a filler, and (4) a mixture of a resin base material with a fibrous material and a filler. Now, the resin base material, the fibrous material, and the filler are described.

[2.1. Resin Base Material]

The resin base material is any one selected from a tetrafluoroethylene resin (PTFE), a polyamide resin (PA), a polyamide imide resin (PAI), a polyimide resin (PI), a polybenzimidazole resin (PBI), aromatic polyether ketones (PAEK), a modified polyether ketone resin, a polyphenylene sulfide resin (PPS), a crystalline polymer, a phenol resin, a polyethylene resin, a polystyrene resin, an acrylic resin, an acrylonitrile butadiene styrene resin, a polyacetal resin, a polycarbonate resin, a polyether sulfone resin (PES), and a polyether imide resin (PEI), or a mixture (including polymer alloys and copolymers thereof) obtained by selecting and mixing a plurality of those materials.

[2.2. Fibrous Material]

The fibrous material is reinforced fiber having a mean fiber length falling within a range of, for example, from about 0.0001 mm to about 5 mm. Fibrous members thereof include those made of inorganic fiber such as carbon fiber, glass fiber, and potassium titanate fiber and so on as a material and those made of organic fiber such as aramid fiber and fluorine fiber and so on as a material. However, the material of the fibrous member is not limited to those described above. Further, a mixture of at least one fiber material selected from those described above and another fibrous material may also be used.

When the fibrous material is glass fiber, it is suitable that the glass fiber is mixed at a weight ratio falling within a range of from 1 to 40% by weight per product. Further, when the fibrous material is carbon fiber or aramid fiber, it is suitable that the carbon fiber or the aramid fiber is mixed at a weight ratio falling within a range of from 1 to 45% by weight per product. Further, when the fibrous material is fluorine fiber, it is suitable that the fluorine fiber is mixed at a weight ratio falling within a range of from 5 to 55% by weight per product. Further, When the fibrous material is potassium titanate fiber, it is suitable that the potassium titanate fiber is mixed at a weight ratio falling within a range of from 0.1 to 5% by weight per product.

[2.3. Filler]

The filler is any one of a tetrafluoroethylene resin (PTFE), manganese sulfide (MnS), molybdenum disulfide ($MoS_2$), graphite, calcium carbonate ($CaCo_3$), titanium oxide, and melamine cyanurate (MCA), or a mixture obtained by selecting and mixing a plurality of those fillers.

[2.4. Surface Treatment on Resin Thrust Washer 20]

Examples of a surface treatment (including a surface modification treatment here) on the resin thrust washer 20 include a surface modification treatment using epoxy silane (manufactured by Shin-Etsu Chemical Co., Ltd.), a surface modification treatment using a titanate-based or aluminate-based coupling agent (more specifically, bis(dioctylpyrophosphate) isopropoxy titanate (manufactured by Ajinomoto Fine-Techno Co., Ltd. under a commercial name of 38S), a surface modification treatment using bis(dioctylpyrophosphate) oxyacetate titanate manufactured by Ajinomoto Fine-Techno Co., Ltd. under a commercial name of 138S, a surface modification treatment using a commercial name 55 (manufactured by Ajinomoto Fine-Techno Co., Ltd.), and a surface modification treatment using acetoalkoxy aluminum diisopropylate (manufactured by Ajinomoto Fine-Techno Co., Ltd. under a commercial name of AL-M). Any one or a plurality of surface treatments (surface modification treatments) may be selected and conducted for surface treatment (surface modification treatment). Further, in place of the surface treatments (surface modification treatments) described above, a coupling treatment using corona discharge or ion plasma discharge may be conducted. In place of the surface modification treatments described above, a DLC treatment or Mo-coating may be conducted. In particular, the DLC treatment enables a reduction in friction and improvement of abrasion resistance in a sliding area, and thus the DLC treatment is preferred.

3. Specific Configuration of Resin Thrust Washer 20A (1) First Configuration Example of Resin Thrust Washer 20A Now, a specific configuration of the resin thrust washer 20A is described. First, the resin thrust washer 20A according to a first configuration example is described. As illustrated in FIG. 2, the resin thrust washer 20A is provided with a ring-shaped portion 21 to cover an insertion hole 22. On the inner circumference of the ring-shaped portion 21 (on the side of the insertion hole 22 side), there is an oil introducing grooves 23 for introducing lubricating oil to the oil grooves 25, the oil introducing grooves 23 is provided in such a shape that is recessing an inner peripheral wall from the insertion hole 22 side to a radially outer side. In other words, a rotating shaft, which is not shown in the figure, is placed in the insertion hole 22. Without the oil introduction grooves 23, the supply of lubricating oil along the rotating shaft may be obstructed and thereby the lubricating oil may not be sufficiently supplied to the oil grooves 25. With the oil introducing grooves 23, however, the lubricating oil can be appropriately introduced into the oil grooves 25.

Further, an oil scooping surface 24 is provided on the inner circumference side (insertion hole 22 side) of the ring-shaped portion 21. The oil scooping surface 24 is a portion configured to guide the lubricating oil introduced through the oil introducing grooves 23 in a circumferential direction of the ring-shaped portion 21. The oil scooping surface 24 is formed by processing the inner circumference side of the ring-shaped portion 21 into, for example, a tapered shape or a curved shape.

Figure 4:
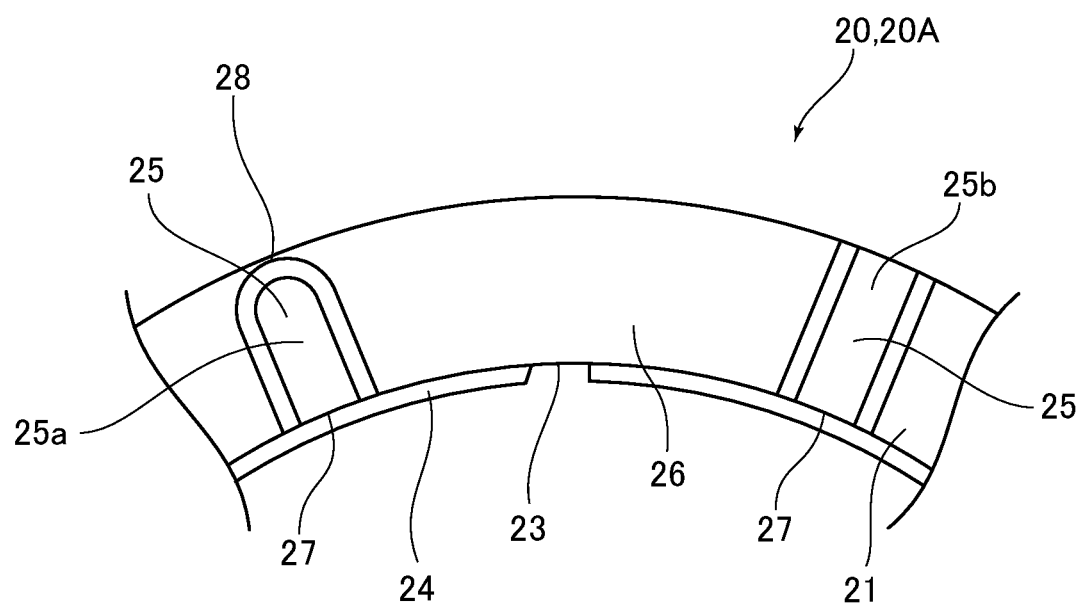
FIG. 4 is a partial plan view for illustrating a configuration of a resin thrust washer according to a first configuration example.

Further, the ring-shaped portion 21 has the oil grooves 25. FIG. 4 is a partial plan view for illustrating the configuration of the resin thrust washer 20A according to the first configuration example. As illustrated in FIG. 2 and FIG. 4, the oil grooves 25 are recessed from a front surface or a back surface of the ring-shaped portion 21, which faces another member (mating member C1, C2, another resin thrust washer 20, or a metal thrust washer; hereinafter referred to simply as "another member"). In the following description, the front surface and the back surface of the ring-shaped portion 21 are referred to as "sliding surfaces 26". In the configuration illustrated in FIG. 2, the opening portion 27 being open to the insertion hole 22 side is provided on the radially inner side of each of the oil grooves 25. Thus, the lubricating oil is supplied to the oil grooves 25 from the insertion hole 22 side.

The oil grooves 25 include the non-communicating oil grooves 25a and the communicating oil grooves 25b. A radially outer side of each of the non-communicating oil grooves 25a is not in communication with an outer periphery side of the resin thrust washer 20A (ring-shaped portion 21). Specifically, there is an oil stop wall 28 which prevents the lubricating oil from flowing out to the outer periphery side. Note that the oil stop walls 28 are flush with the sliding surface 26. However, the oil stop walls 28 may be provided in such a manner as to have a certain degree of level difference with respect to the sliding surface 26. Meanwhile, there is no oil stop walls 28 on a radially outer side of the ring-shaped portion 21, so that the lubricating oil can freely flow from the radially inner side (insertion hole 22 side) to the radially outer side.

It is preferred that a width of the oil stop wall 28 falls within a range of from 0.01 mm to 0.1 mm. The reason is as follows. It is difficult to set the width of the oil stop wall 28 smaller than 0.01 mm in terms of processing accuracy. When the width of the oil stop wall 28 is set larger than 0.1 mm, an influence of a sliding load generated at the oil stop wall 28 on the resin thrust washer 20 is increased.

In this case, the non-communicating oil grooves 25a and the communicating oil grooves 25b according to the first configuration example are provided along a radial direction of the ring-shaped portion 21.

The above-mentioned communicating oil grooves 25b enable a flow rate of the lubricating oil passing to the radially outer side to be increased in comparison to the non-communicating oil grooves 25a. Thus, a heat radiation property of the resin thrust washer 20A can be improved.

Figure 5:
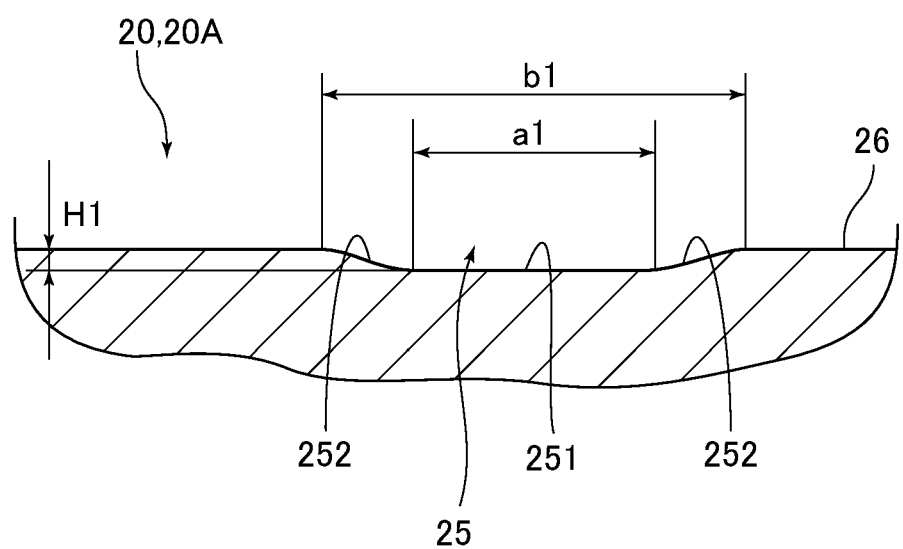
FIG. 5 is a cross-sectional view of an oil groove illustrated in FIG. 4, which is taken along a width direction thereof.

Further, the cross-sectional shape of the above-mentioned oil grooves 25 (non-communicating oil grooves 25a and communicating oil grooves 25b) is as illustrated in FIG. 5. In a configuration illustrated in FIG. 5, a pair of tapered wall surfaces 252 are provided in such a manner as to extend from a bottom portion 251 of the oil groove 25 toward the sliding surface 26. Each of the tapered wall surfaces 252 is a portion that is linearly inclined at a predetermined inclination angle with respect to the sliding surface 26. The tapered wall surface 252 may have a portion inclined in a curved manner in addition to a linearly inclined portion.

Further, an oil groove area ratio with respect to the ring-shaped portion 21 falls within a range of from 15% to 40%. In other words, a sliding area ratio obtained by subtracting the oil groove area ratio from the ring-shaped portion 21 falls within a range of from 60% to 85%. When the sliding area ratio falls within the above-mentioned range, the sliding load is the smallest as described later.

In this case, the sliding area ratio is a ratio of the sliding surface 26 with respect to a projection plane in plan view of the resin thrust washer 20 (ring-shaped portion 21). Further, the oil groove area ratio is a ratio of an area obtained by excluding the sliding surface 26 from the projection plane in the above-mentioned plan view of the resin thrust washer 20 (ring-shaped portion 21) (ratio of a portion that is not in contact with the mating member C1, C2). Thus, the oil groove area ratio includes, for example, the oil scooping surfaces 24, the oil grooves 25 (non-communicating oil grooves 25a and communicating oil grooves 25b), dynamic-pressure guiding wall surface 254, and surrounded portions 111 (see FIG. 23), which are at a lower level than that of the sliding surface 26.

Further, in the configuration illustrated in FIG. 2, a total number of the non-communicating oil grooves 25a and the communicating oil grooves 25b is eight. In addition, the non-communicating oil grooves 25a and the communicating oil grooves 25b are provided alternately in the circumferential direction. Thus, the number of non-communicating oil grooves 25a and the number of communicating oil grooves 25b are the same. However, the total number of the non-communicating oil grooves 25a and the communicating oil grooves 25b is not limited to eight. Such configuration examples are illustrated in FIG. 6 and FIG. 7.

Figure 6:
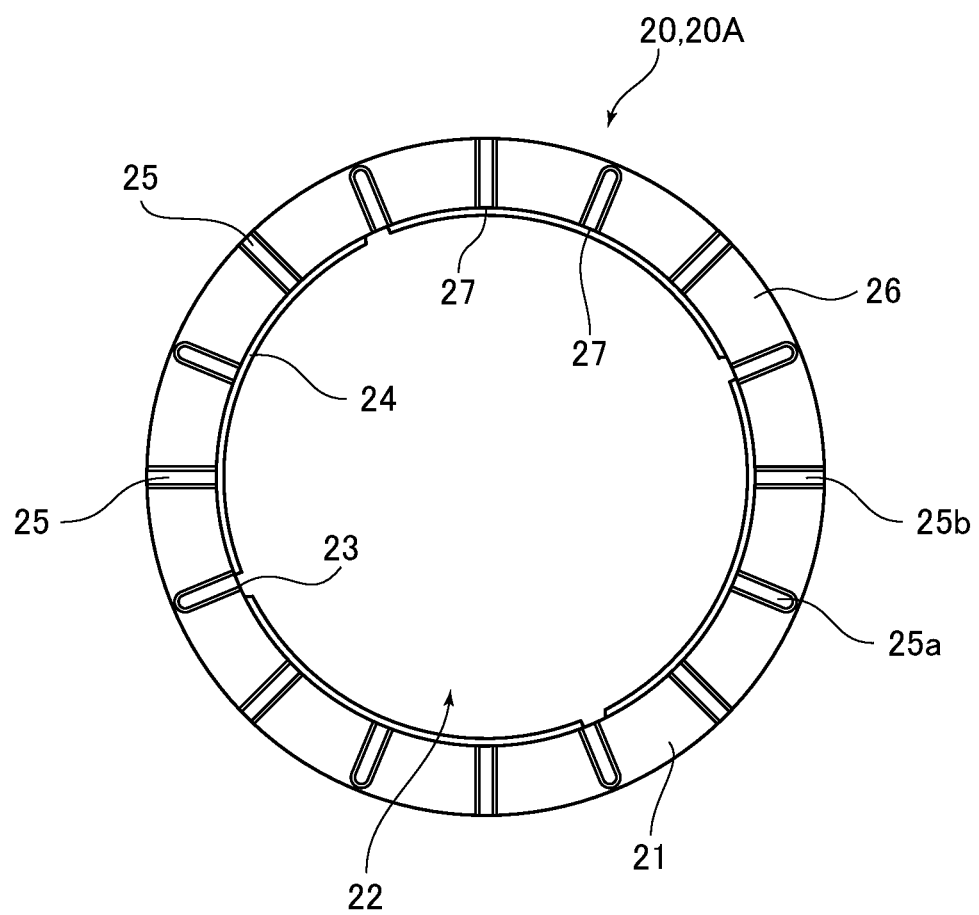
FIG. 6 is a plan view for illustrating a configuration of a resin thrust washer according to a modification example of the first configuration example.

FIG. 6 is a plan view for illustrating a configuration of the resin thrust washer 20A according to a modification example of the first configuration example. The resin thrust washer 20A illustrated in FIG. 6 has a total of sixteen non-communicating oil grooves 25a and communicating oil grooves 25b. Further, FIG. 7 is a plan view for illustrating a configuration of the resin thrust washer 20A according to a modification example of the first configuration example. The resin thrust washer 20A illustrated in FIG. 7 has a total of thirty-two non-communicating oil grooves 25a and communicating oil grooves 25b.

Figure 8:
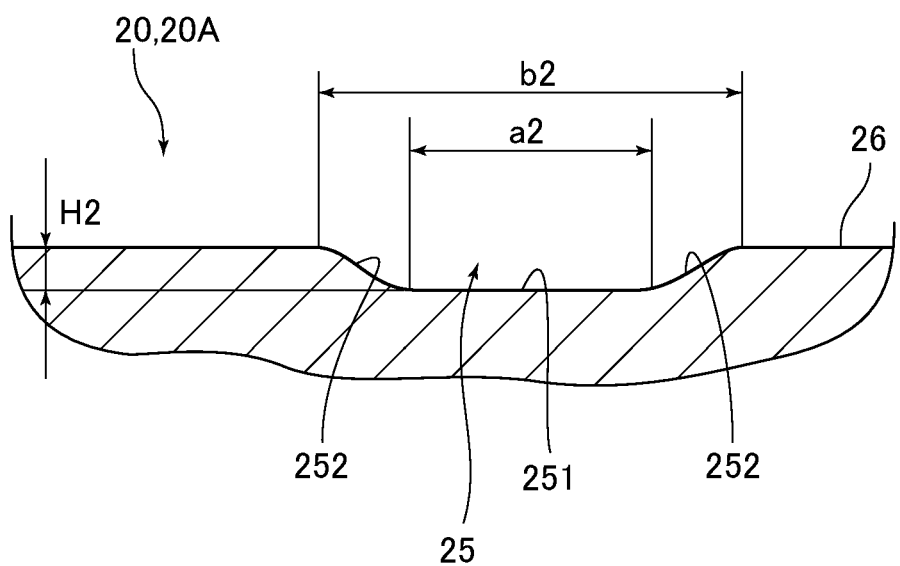
FIG. 8 is a cross-sectional view of an oil groove illustrated in FIG. 6, which is taken along a width direction thereof.

Further, a cross-sectional shape of each of the oil grooves 25 (non-communicating oil grooves 25a and communicating oil grooves 25b) illustrated in FIG. 6 is illustrated in FIG. 8. Similarly to the oil grooves 25 illustrated in FIG. 5, also in the oil grooves 25 illustrated in FIG. 8, the pair of tapered wall surfaces 252 are provided in such a manner as to extend from the bottom portion 251 of the oil groove 25 toward the sliding surface 26. Each of the tapered wall surfaces 252 is a portion that is linearly inclined at a predetermined inclination angle with respect to the sliding surface 26. The tapered wall surface 252 may have a portion inclined in a curved manner in addition to a linearly inclined portion.

Figure 7:
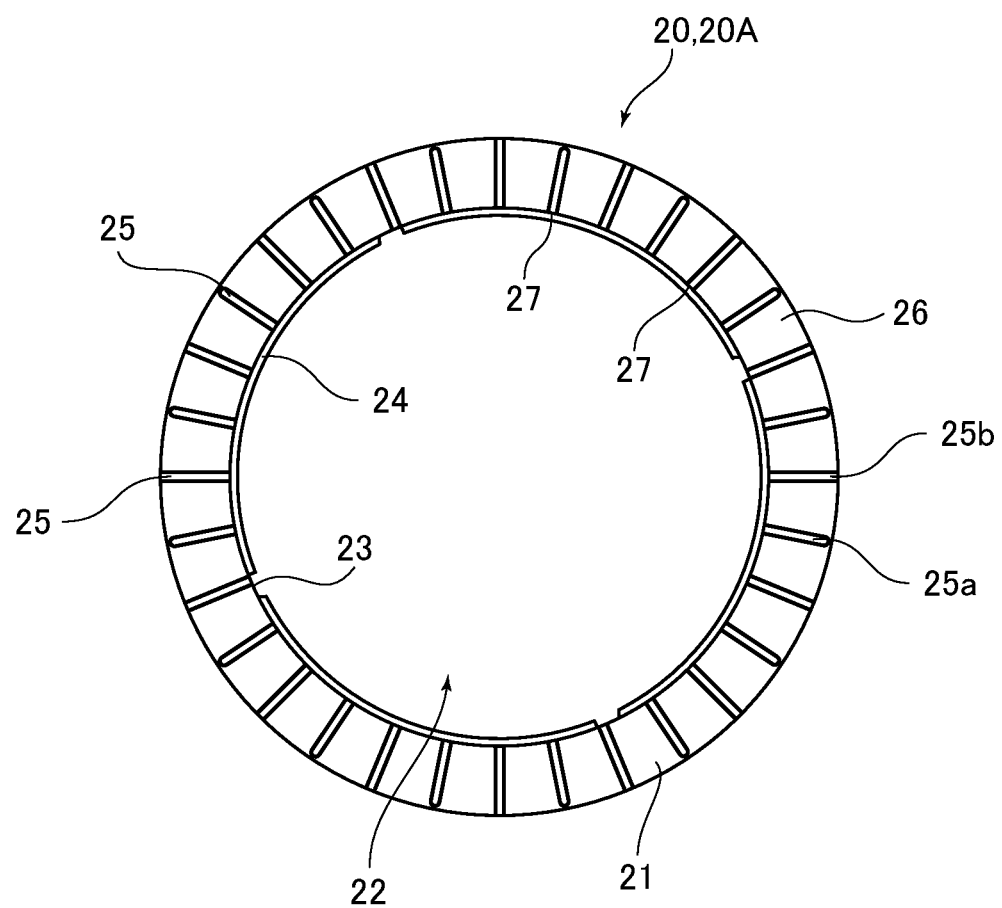
FIG. 7 is a plan view for illustrating a configuration of a resin thrust washer according to a modification example of the first configuration example.
Figure 9:
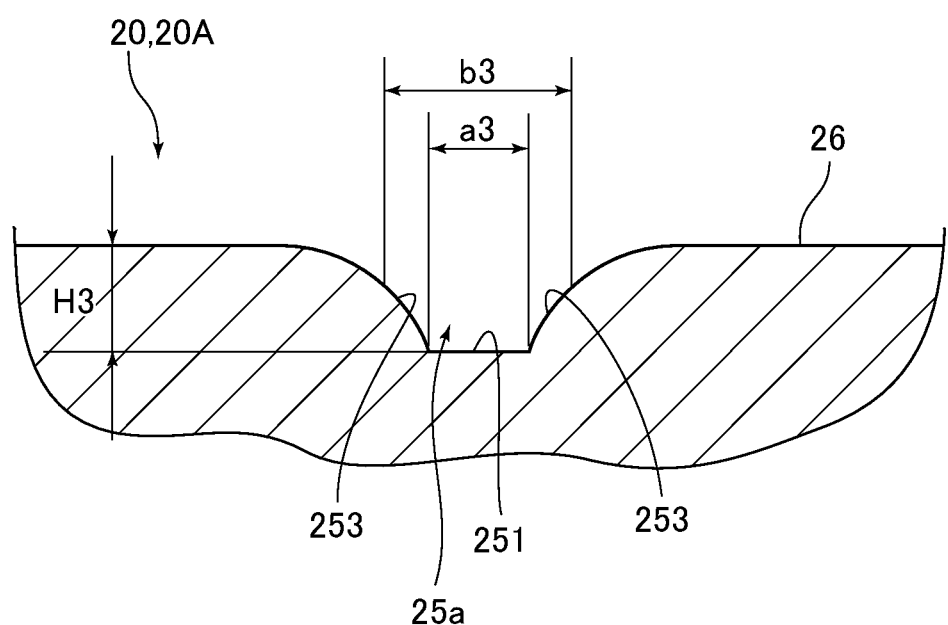
FIG. 9 is a cross-sectional view of a non-communicating oil groove among oil grooves illustrated in FIG. 7, which is taken along a width direction thereof.
Figure 10:
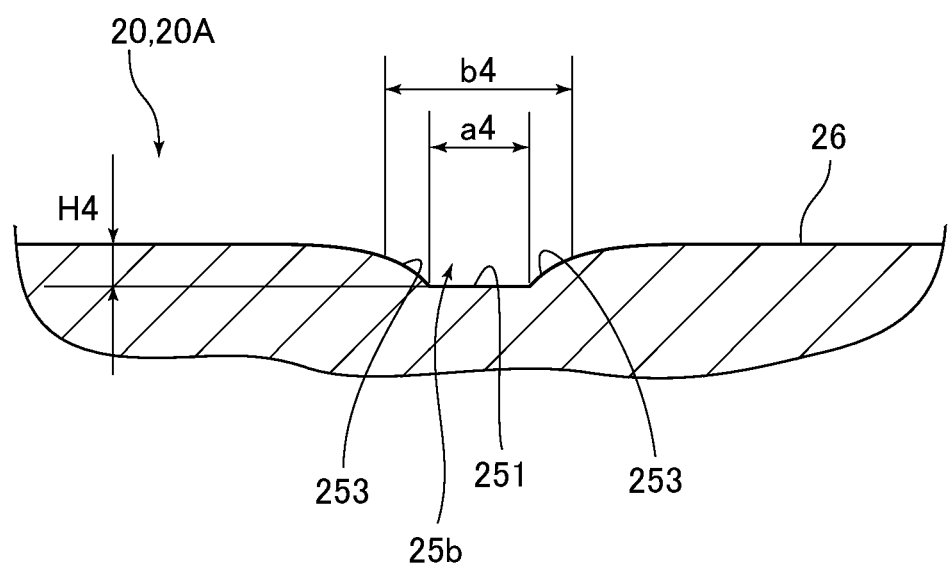
FIG. 10 is a cross-sectional view of a communicating oil groove among the oil grooves illustrated in FIG. 7, which is taken along a width direction thereof.

Further, a cross-sectional shape of the non-communicating oil groove 25a among the oil grooves 25 illustrated in FIG. 7 is illustrated in FIG. 9. Further, a cross-sectional shape of the communicating oil groove 25b among the oil grooves illustrated in FIG. 7 is illustrated in FIG. 10. In a configuration illustrated in FIG. 9, in place of the tapered wall surfaces 252 illustrated in FIG. 5 and FIG. 8, projecting curved-surface portions 253 are provided. The projecting curved-surface portions 253 are projecting curved surfaces that connect the bottom portion 251 and the sliding surface 26 to each other. In contrast to substantially S-shaped curved surfaces (such as curved wall surfaces described later), the projecting curved-surface portions 253 have a sectional shape without an inflection point. In the configuration illustrated in FIG. 9, each of the projecting curved-surface portions 253 is provided to have a shape similar to, for example, a rounded chamfered shape. However, each of the projecting curved-surface portions 253 may have, for example, a linear portion or a recessed curved-surface portion in addition to a projecting curved-surface portion. Further, similarly to the configuration illustrated in FIG. 9, a configuration illustrated in FIG. 10 includes the projecting curved-surface portions 253.

The oil grooves 25 illustrated in FIG. 8 and FIG. 9 may also have the following configuration. Specifically, a dimension a2, a3 and/or a dimension b2, b3 of the oil groove 25 may be decreased toward the radially outer side. In this case, the dimension a2, a3 of the oil groove 25 may be linearly (proportionally) changed from the radially inner side toward the radially outer side, but may also be curvilinearly changed instead of being linearly (proportionally) changed. Further, the dimension b2, b3 of the oil groove 25 changes in association with a change in dimension a2, a3, and the dimension may be changed in any mode. Further, the dimension b2, b3 of the oil groove 25 may be thoroughly a given dimension without being changed in association with a change in dimension a2, a3. The dimension b2, b3 may be changed in a part of the oil groove 25.

Further, a dimension H2, H3 corresponding to a depth of the oil groove 25 from the sliding surface 26 may be decreased toward the radially outer side. In this case, the dimension H2, H3 of the oil groove 25 may be linearly (proportionally) decreased from the radially inner side toward the radially outer side, but may also be curvilinearly changed instead of being linearly (proportionally) changed. Further, both of the dimension a2, a3 and the dimension H2, H3 may be decreased from the radially inner side toward the radially outer side of the resin thrust washer 20A. However, any one of the dimension a2, a3 and the dimension H2, H3 may be decreased from the radially inner side toward the radially outer side of the resin thrust washer 20A.

Dimensions a4 to a6, a11 to a16, a18, b4 to b6, b11, b13, b15, b16, b18, H4 to H6, H11 to H13, H15, H16, H18, H141, and H142 in configuration examples described later may be changed in the same manner as that described above.

In the resin thrust washer 20A according to the first configuration example, the oil groove area ratio (sliding area ratio) is substantially the same for the configuration illustrated in FIG. 2, the configuration illustrated in FIG. 6, and the configuration illustrated in FIG. 7.

(2) Second Configuration Example of Resin Thrust Washer 20A

Figure 11:
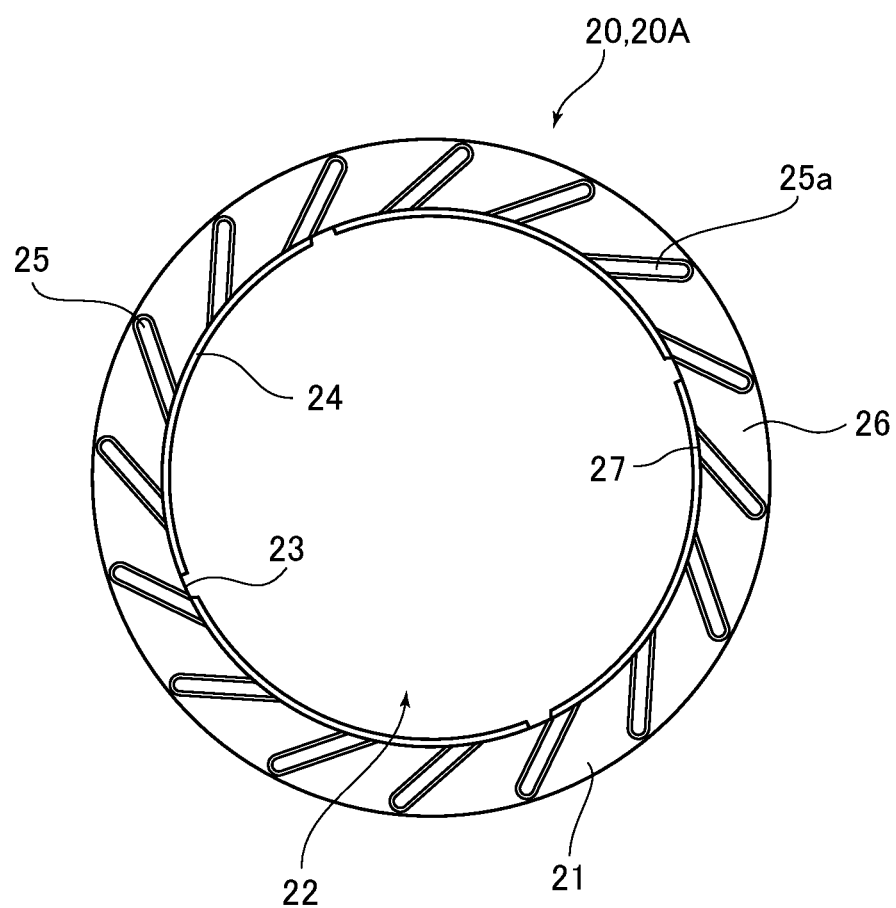
FIG. 11 is a plan view for illustrating a configuration of a resin thrust washer according to a second configuration example.
Figure 12:
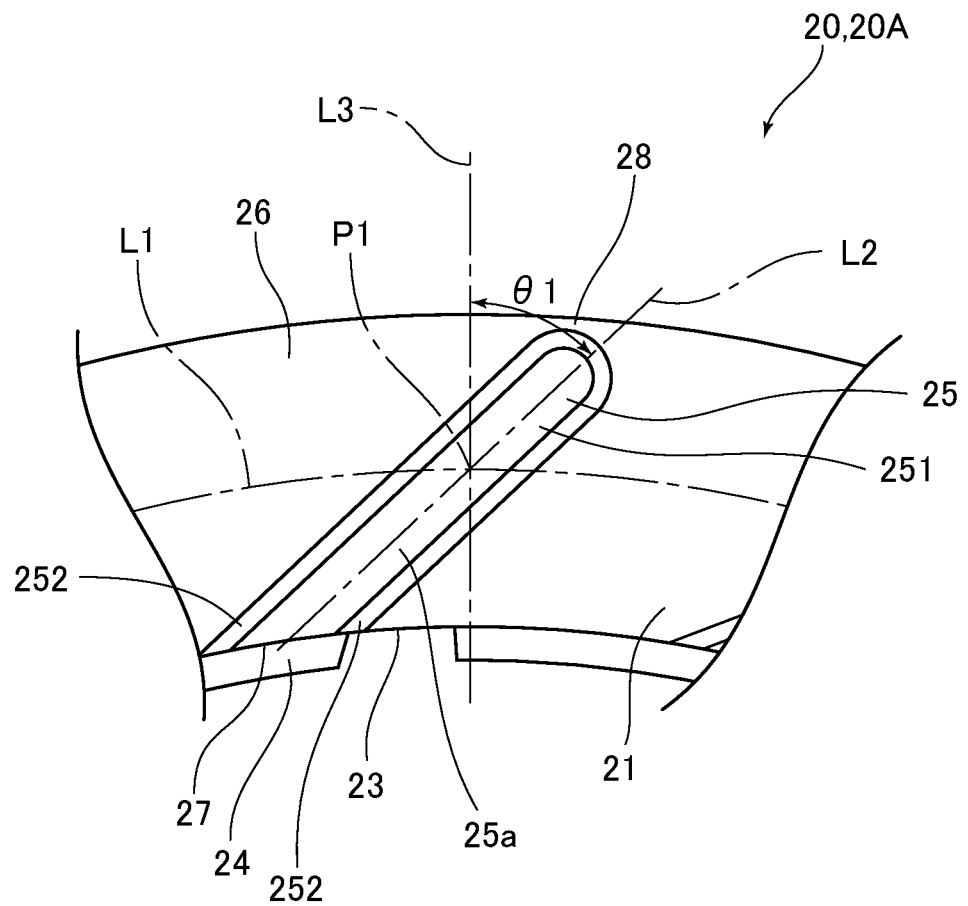
FIG. 12 is a partial plan view for illustrating the configuration of the resin thrust washer according to the second configuration example.
Figure 13:
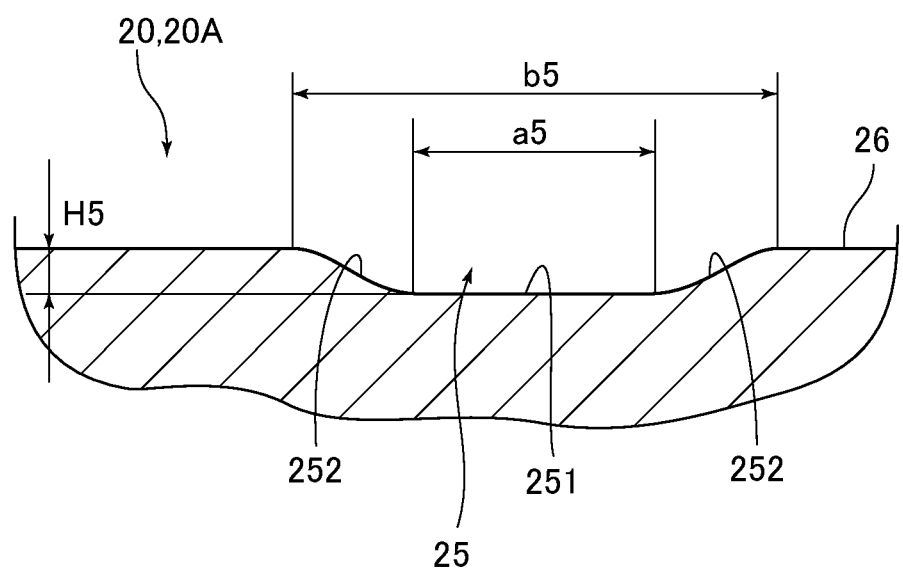
FIG. 13 is a cross-sectional view of an oil groove illustrated in FIG. 11 and FIG. 12, which is taken along a width direction thereof.

Next, the resin thrust washer 20A according to a second configuration example is described. FIG. 11 is a plan view for illustrating a configuration of the resin thrust washer 20A according to the second configuration example. FIG. 12 is a partial plan view for illustrating the configuration of the resin thrust washer 20A according to the second configuration example. FIG. 13 is a cross-sectional view of the oil groove 25 illustrated in FIG. 11 and FIG. 12, which is taken along a width direction thereof.

In the resin thrust washer 20A according to the second configuration example, which is illustrated in FIG. 11 and FIG. 12, in contrast to the resin thrust washer 20A according to the first configuration example, the oil grooves 25 include only the non-communicating oil grooves 25a, and do not include the communicating oil grooves 25b. In the second configuration example, however, the oil grooves 25 may include the communicating oil grooves 25b together with the non-communicating oil grooves 25a.

Also in the resin thrust washer 20A according to the second configuration example, the oil groove area ratio is set to fall within the range of from 15% to 40%. In other words, the sliding area ratio of the sliding surface 26 is set to fall within the range of from 60% to 85%. Under this state, as described later, the sliding load on the sliding surface 26 is the smallest.

Further, as illustrated in FIG. 12, a middle line L1 in the radial direction (width direction) of the ring-shaped portion 21 intersects with a center line L2 of the non-communicating oil groove 25a at an intersection position P1. An angle formed by the center line L2 with respect to a radial line L3 that passes through the intersection position P1 and extends along the radial direction is represented as an inclination angle $\theta 1$. When the inclination angle $\theta 1$ of the non-communicating oil groove 25a is equal to or larger than 30 degrees, as described later, abrasion of the resin thrust washer 20 is reduced, and the sliding load on another member is reduced in comparison to the configuration including the non-communicating oil grooves 25a extending along the radial direction, as illustrated in FIG. 2 and other drawings. In the following configuration examples (for example, a fourth configuration example), an inclination angle formed by the center line L2 with respect to a line similar to the radial line L3 at a position similar to the above-mentioned intersection position P1 is described as the inclination angle $\theta 1$ in some cases.

In this case, when the inclination angle $\theta 1$ is larger than 55 degrees, each of the non-communicating oil grooves 25a has an increased length. In this case, the oil groove area ratio has a predetermined value falling within the range of from 15% to 40%. Thus, a width dimension of the non-communicating oil groove 25a is reduced correspondingly to an increase in length of the non-communicating oil groove 25a. As a result, the width of each of the non-communicating oil grooves 25a is so small that shapes of the grooves may collapse, or the number of non-communicating oil grooves 25a needs to be reduced due to interference with other non-communicating oil groove 25a. Accordingly, it is preferred that the inclination angle $\theta 1$ be set to 55 degrees or smaller. Specifically, it is preferred that the inclination angle $\theta 1$ be set to fall within a range of from 30 degrees to 55 degrees.

Further, as illustrated in FIG. 11 and FIG. 12, the pair of tapered wall surfaces 252 are provided in such a manner as to extend from the bottom portion 251 of the oil groove 25 toward the sliding surface 26 in the resin thrust washer 20A according to the second configuration example. Each of the tapered wall surfaces 252 is a portion that is linearly inclined at a predetermined inclination angle with respect to the sliding surface 26, and may include a portion that is inclined in a curved manner in addition to the linearly inclined portion.

The resin thrust washer 20A according to the second configuration example may have the following configurations. Specifically, a shape of the oil groove 25 is not limited to be linear. The oil groove 25 may be provided in a curved manner, or may have both of a linear portion and a curved portion. Further, a dimension a5 and/or a dimension b5 (see FIG. 13) of the oil groove 25 may be decreased toward the radially outer side. As such a dimensional example, there is given a case in which the dimension a5 of an end portion of the oil groove 25 on the radially inner side is set to 0.8 mm and a dimension of an end portion of the oil groove 25 on the radially outer side is set to 0.03 mm. However, the dimensions of the end portions are not limited to those described above.

Further, a dimension H5 (see FIG. 13) corresponding to a depth of the oil groove 25 from the sliding surface 26 may be decreased toward the radially outer side. In this case, the dimension H5 of the oil groove 25 may be linearly (proportionally) decreased from the radially inner side toward the radially outer side, but may also be curvilinearly changed instead of being linearly (proportionally) changed. Further, both of the dimension a5 and the dimension H5 may be decreased from the radially inner side toward the radially outer side of the resin thrust washer 20A. However, any one of the dimension a5 and the dimension H5 may be decreased from the radially inner side toward the radially outer side of the resin thrust washer 20A.

(3) Third Configuration Example of Resin Thrust Washer 20A

Figure 14:
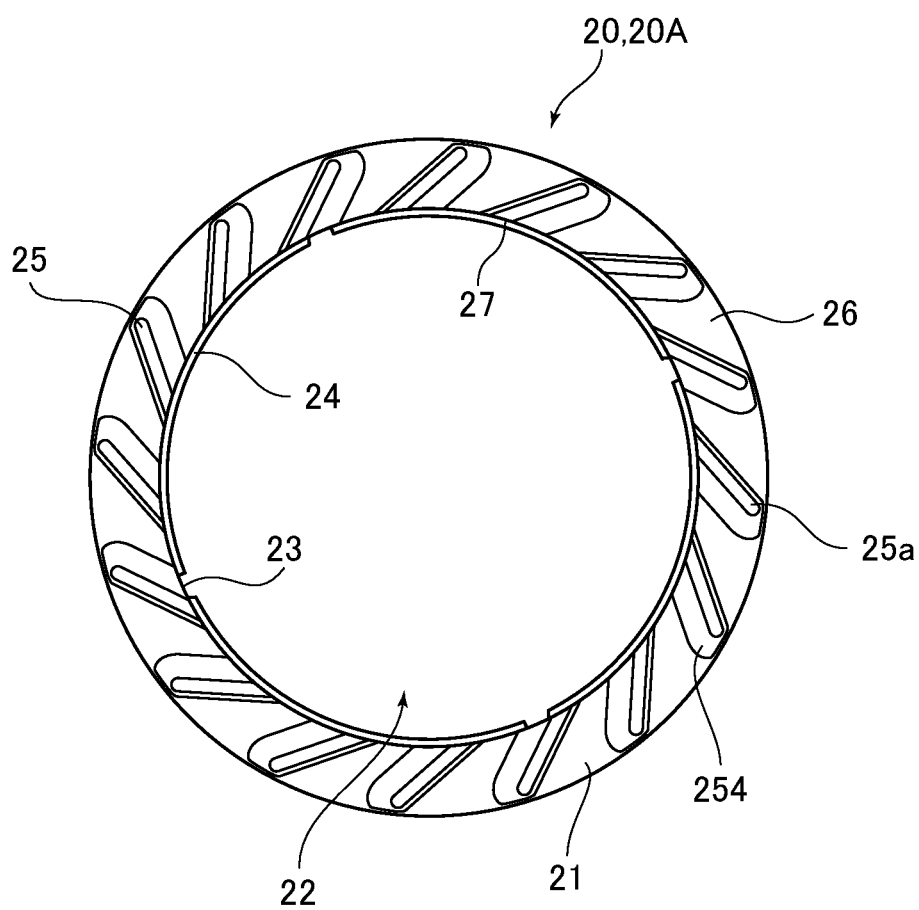
FIG. 14 is a plan view for illustrating a configuration of a resin thrust washer according to a third configuration example.
Figure 15:
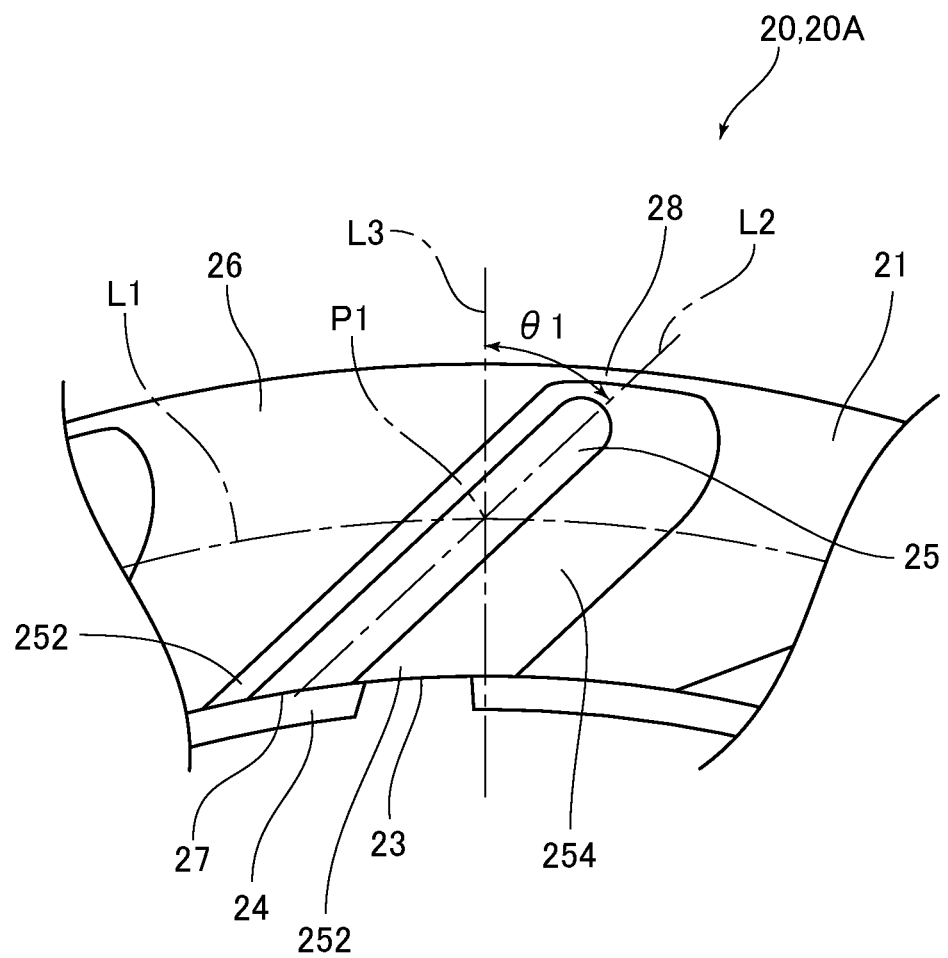
FIG. 15 is a partial plan view for illustrating the configuration of the resin thrust washer according to the third configuration example.
Figure 16:
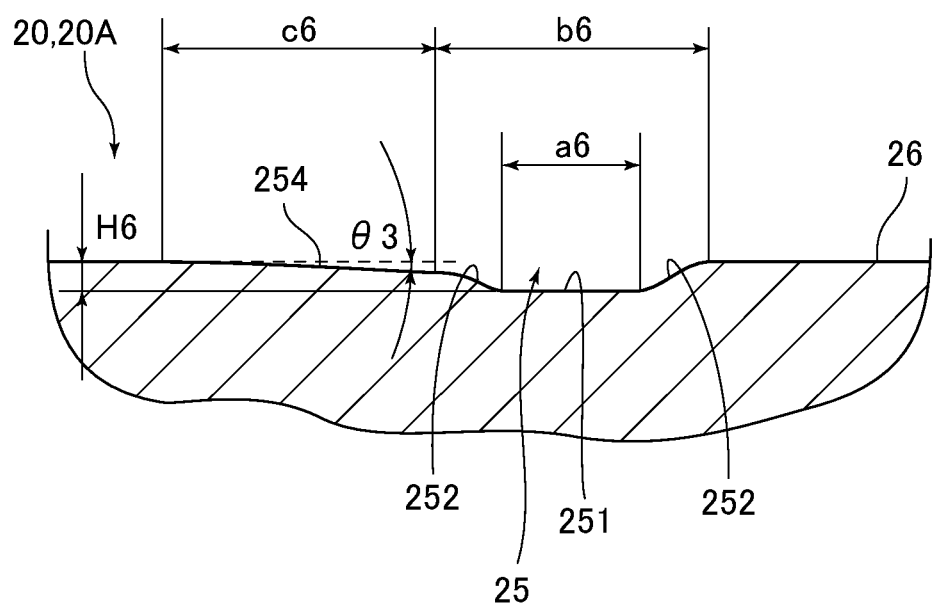
FIG. 16 is a cross-sectional view of an oil groove illustrated in FIG. 14 and FIG. 15, which is taken along a width direction thereof.

Next, the resin thrust washer 20A according to a third configuration example is described. FIG. 14 is a plan view for illustrating a configuration of the resin thrust washer 20A according to the third configuration example. FIG. 15 is a partial plan view for illustrating the configuration of the resin thrust washer 20A according to the second configuration example. FIG. 16 is a cross-sectional view of the oil groove 25 illustrated in FIG. 14 and FIG. 15, which is taken along a width direction thereof.

In the resin thrust washer 20A according to the third configuration example, which is illustrated in FIG. 14 and FIG. 15, similarly to the oil grooves 25 of the resin thrust washer 20A according to the second configuration example, the oil grooves 25 include only the non-communicating oil grooves 25a, and do not include the communicating oil grooves 25b. In the third configuration example, however, the oil grooves 25 may include the communicating oil grooves 25b together with the non-communicating oil grooves 25a. Further, as illustrated in FIG. 15 and FIG. 16, the oil groove 25 has the bottom portion 251 and the tapered wall surfaces 252.

As illustrated in FIG. 15 and FIG. 16, in the resin thrust washer 20A according to the third configuration example, the dynamic-pressure guiding wall surface 254 is provided adjacent to the oil groove 25. The dynamic-pressure guiding wall surface 254 is a portion configured to allow the lubricating oil flowing into the non-communicating oil groove 25a to easily be guided to the sliding surface 26. Thus, an inclination angle (see FIG. 16) of the dynamic-pressure guiding wall surface 254 with respect to the sliding surface 26 is set significantly smaller than the inclination angle of the tapered wall surface 252 with respect to the sliding surface 26. When the lubricating oil is guided by the dynamic-pressure guiding wall surface 254 toward the sliding surface 26, pressure (dynamic pressure) can be generated by the lubricating oil between the sliding surface 26 and another member. The pressure (dynamic pressure) enables a reduction in sliding load between the sliding surface 26 and another member.

4. Specific Configuration of Resin Thrust Washer 20B

Next, the configuration of the resin thrust washer 20B including the oil grooves 25 (having first oil grooves 25c and second oil grooves 25d) having substantially V-like shaped shape is described below. All the oil grooves 25 of the resin thrust washer 20B are the non-communicating oil grooves 25a except for communicating oil grooves 113 of the resin thrust washer 20 according to a ninth configuration example (see FIG. 27) described later. However, the resin thrust washer 20B having a configuration other than a configuration according to the ninth configuration example may have the communicating oil grooves 25b.

(1) Fourth Configuration Example of Resin Thrust Washer 20B

Figure 17:
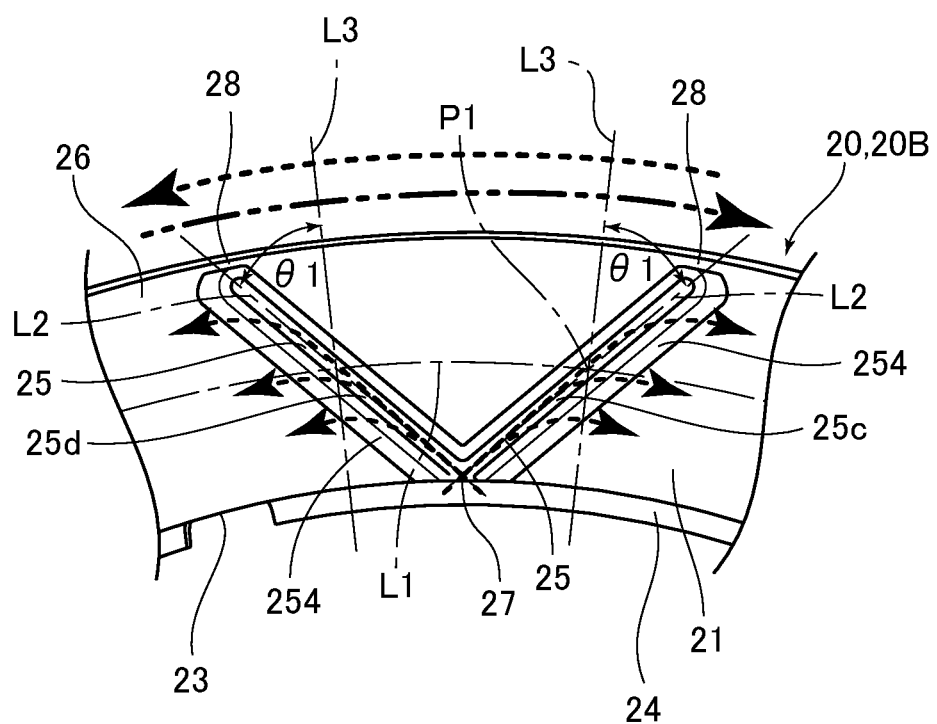
FIG. 17 is a partial plan view for illustrating a configuration of a resin thrust washer according to a fourth configuration example.

FIG. 17 is a partial plan view for illustrating a configuration of the resin thrust washer 20B according to a fourth configuration example. As illustrated in FIG. 3 and FIG. 17, the resin thrust washer 20B includes, similarly to the resin thrust washer 20A described above, the ring-shaped portion 21, the insertion hole 22, the oil introducing grooves 23, the sliding surface 26, the opening portions 27, and the oil stop walls 28. In the resin thrust washer 20B, however, the form of the oil grooves 25 is different. More specifically, in the resin thrust washer 20B, two oil grooves 25 having different inclination angles are connected to each other on the opening portion 27 side, and are arranged to form a V-like shape.

In the following description, one of the oil grooves 25 for forming a substantially V shape is referred to as "first oil groove 25c", and another one thereof is referred to as "second oil groove 25d". In FIG. 3 and FIG. 17, the first oil groove 25c is inclined clockwise from a radially inner side toward a radially outer side. Meanwhile, the second oil groove 25d is inclined counterclockwise from a radially inner side toward a radially outer side. When the first oil grooves 25c and the second oil grooves 25d are not required to be distinguished from each other, the first oil grooves 25c and the second oil grooves 25d are referred to simply as "oil grooves 25".

In this case, the first oil groove 25c and the second oil groove 25d may be completely connected to each other on the opening portion 27 side. However, the first oil groove 25c and the second oil groove 25d may be slightly separate from each other.

Further, as illustrated in FIG. 17, it is preferred that the inclination angle θ1 fall within the range of from 30 degrees to 55 degrees also for the first oil groove 25c and the second oil groove 25d. Further, it is preferred that a groove width of the oil groove 25 fall within a range of from 1.8 mm to 2.8 mm. Still further, it is preferred that a groove depth of the oil groove 25 fall within a range of from 0.5 mm to 1.0 mm. In FIG. 17, the inclination angle θ1 of the first oil groove 25c and the inclination angle θ1 of the second oil groove 25d may have different values.

Figure 18:
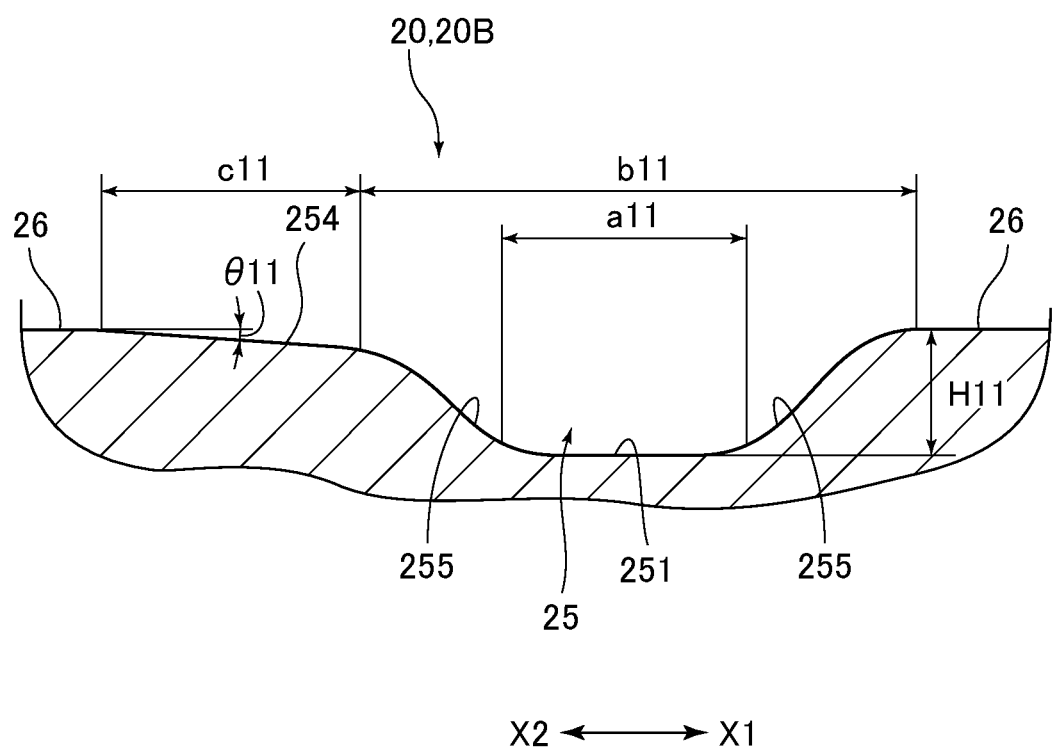
FIG. 18 is a cross-sectional view of an oil groove illustrated in FIG. 3 and FIG. 17, which is taken along a width direction thereof.

Further, the oil groove 25 according to the fourth configuration example, which is illustrated in FIG. 3 and FIG. 17, is formed to have a cross-sectional shape as illustrated in FIG. 18. In a configuration illustrated in FIG. 18, a pair of curved wall surface 255, each having a substantially S-like shape, are provided in such a manner as to extend from the bottom portion 251 of the oil groove 25 toward the sliding surface 26. Thus, the lubricating oil flowed into the oil groove 25 can be suitably supplied to the sliding surface 26 at any one of the pair of curved wall surfaces 255.

Further, as illustrated in FIG. 18, the dynamic-pressure guiding wall surface 254 is provided continuously with the curved wall surface 255 on another side (X2 side in FIG. 18). The dynamic-pressure guiding wall surface 254 is a portion that is linearly inclined at a predetermined inclination angle with respect to the sliding surface 26. The dynamic-pressure guiding wall surface 254 may have a portion inclined in a curved manner in addition to a linearly inclined portion.

In this case, in the fourth configuration example, a total of twelve sets of the first oil groove 25c and the second oil groove 25d, each forming the V-like shape, are provided. Also in a sixth configuration example, a seventh configuration example, an eighth configuration example, and an eleventh configuration example, which are described later, as in the fourth configuration example, a total of six sets of the first oil groove 25c and the second oil groove 25d, each forming the V-like shape, are provided. However, any number of sets of the first oil groove 25c and the second oil groove 25d, each forming the V-like shape, may be provided.

In FIG. 17, a double-point line indicates a clockwise rotating direction of the resin thrust washer 20B, and also indicates flow of the lubricating oil in this case. When the resin thrust washer 20B is rotated clockwise against the lubricating oil that is present on the insertion hole 22 side, the lubricating oil flowing from the opening portion 27 into the oil grooves 25 is mainly supplied not from the first oil groove 25c but from the second oil groove 25d to the sliding surface 26 due to an action of a centrifugal force. Further, in FIG. 17, a broken line indicates a counterclockwise rotating direction of the resin thrust washer 20, and also indicates the flow of the lubricating oil in this case. When the resin thrust washer 20 is rotated counterclockwise, the lubricating oil is mainly supplied not from the second oil groove 25d but from the first oil groove 25c to the sliding surface 26 due to a centrifugal force acting on the lubricating oil.

(2) Fifth Configuration Example of Resin Thrust Washer 20B

Figure 19:
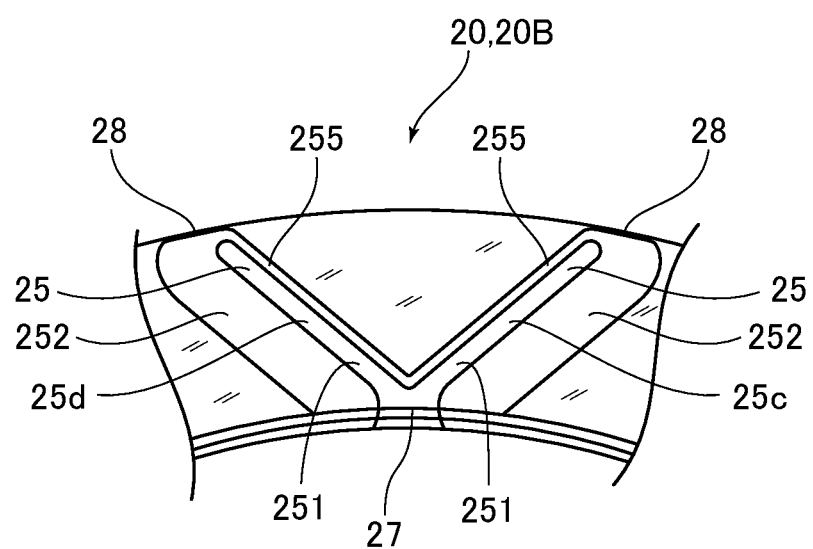
FIG. 19 is a partial plan view for illustrating a configuration of a resin thrust washer according to a fifth configuration example.
Figure 20:
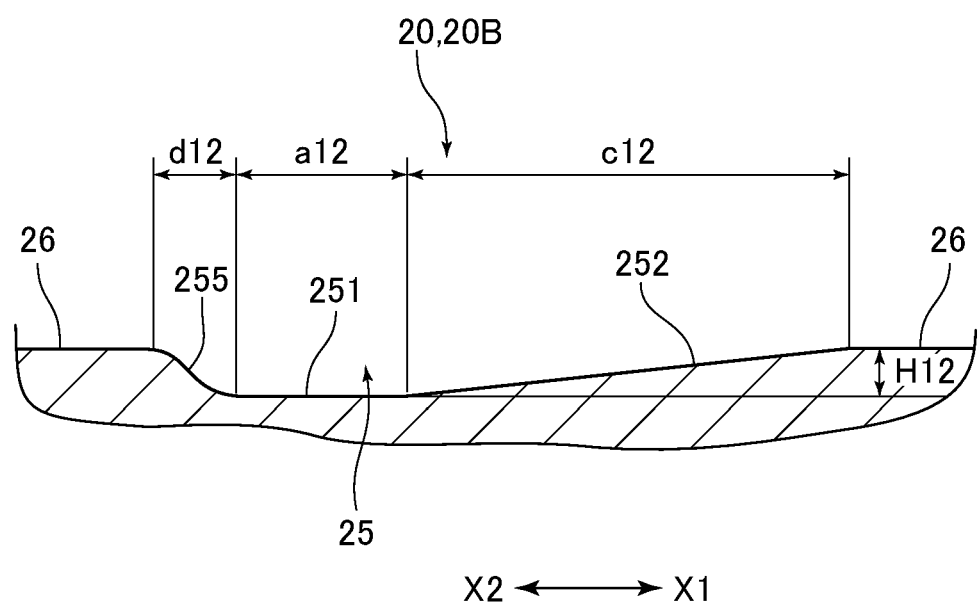
FIG. 20 is a cross-sectional view of an oil groove illustrated in FIG. 19, which is taken along a width direction thereof.

Next, the resin thrust washer 20B according to a fifth configuration example is described. FIG. 19 is a partial plan view for illustrating the configuration of the resin thrust washer 20B according to the fifth configuration example. FIG. 20 is a cross-sectional view of the oil groove 25 illustrated in FIG. 19, which is taken along a width direction thereof. The oil grooves 25 of the resin thrust washer 20B according to the fifth configuration example are different from the oil grooves of the resin thrust washer 20B according to the fourth configuration example in the cross-sectional shape taken along a width direction thereof. However, a configuration of the resin thrust washer 20B according to the fifth configuration example is the same as the configuration of the resin thrust washer 20B according to the fourth configuration example except for the cross-sectional shape of each of the oil grooves 25.

In the oil groove 25 according to the fifth configuration example, which is illustrated in FIG. 19 and FIG. 20, the tapered wall surface 252 is reached from the bottom portion 251 of the oil groove 25 towards one side (X1 side in FIG. 20). Specifically, the tapered wall surface 252 is continuous with the bottom portion 251 on the one side. On the other hand, as in the above-mentioned oil groove 25 illustrated in FIG. 18, from the bottom portion 251 to the other side (X2 side in FIG. 20), the curved wall surface 255 is reached. Specifically, the curved wall surface 255 is continuous with the bottom portion 251 on the another side. A dimension is set so that a length (dimension c12) of the tapered wall surface 252 in the width direction is approximately four times a dimension a12 which is a length of the bottom portion 251 in the width direction.

In the configuration in which two oil grooves 25 are arranged to form a V-like shape, as illustrated in FIG. 19, the tapered wall surface 252 is provided in such a manner as to be located on a radially inner side of the oil groove 25 in the width direction of the oil groove than the curved wall surface 255. With the arrangement described above, when the resin thrust washer 20B is rotated, the lubricating oil is supplied to a portion of the sliding surface 26, which is not surrounded by the two oil grooves 25. However, the tapered wall surface 252 may be located on a radially outer side of the oil groove 25 in the width direction of the oil groove than the curved wall surface 255.

In the fifth configuration example, a total of six sets of the first oil groove 25c and the second oil groove 25d that form a V-like shape are provided at equal intervals in the circumferential direction of the ring-shaped portion 21. However, any number of sets of the first oil groove 25c and the second oil groove 25d that form a V-like shape may be provided.

(3) Sixth Configuration Example of Resin Thrust Washer 20B

Figure 21:
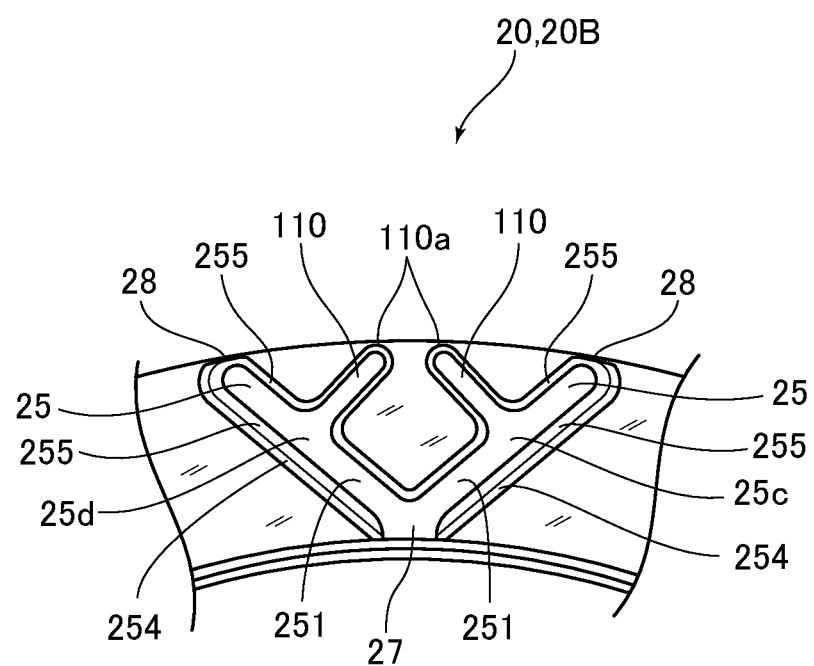
FIG. 21 is a partial plan view for illustrating a configuration of a resin thrust washer according to a sixth configuration example.
Figure 22:
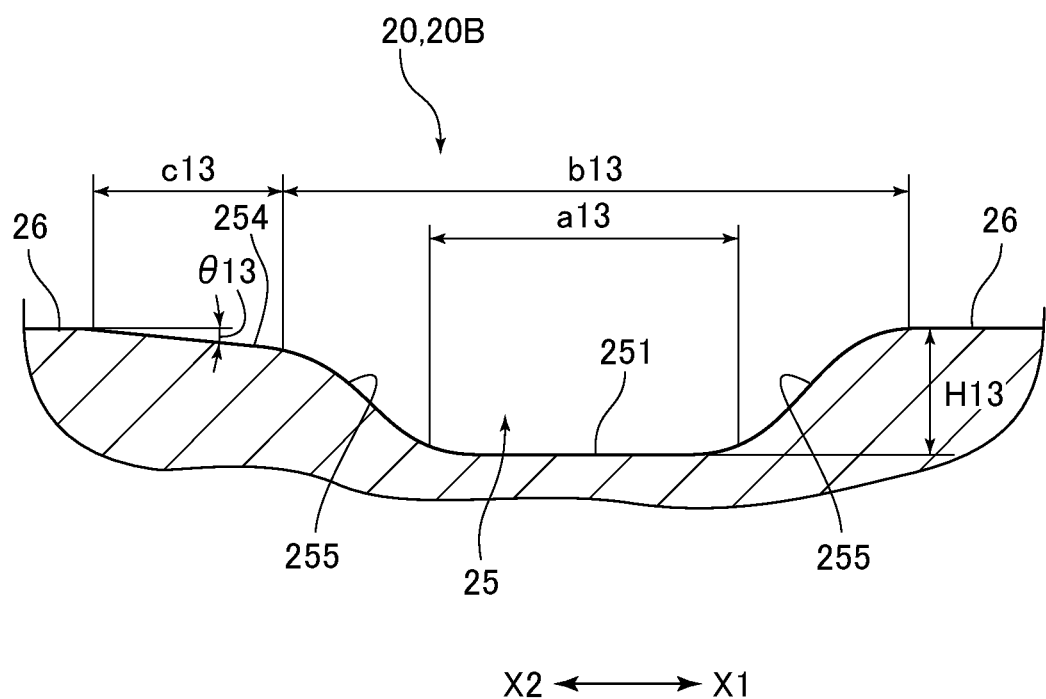
FIG. 22 is a cross-sectional view of an oil groove illustrated in FIG. 21, which is taken along a width direction thereof.

Next, the resin thrust washer 20B according to a sixth configuration example is described. FIG. 21 is a partial plan view for illustrating the configuration of the resin thrust washer 20B according to the sixth configuration example. FIG. 22 is a cross-sectional view of the oil groove 25 illustrated in FIG. 21, which is taken along a width direction thereof. The oil grooves 25 according to the sixth configuration example are different from the oil grooves 25 according to the fourth configuration example in planar shape. However, a cross-sectional shape of each of the oil grooves 25 of the resin thrust washer 20B according to the sixth configuration example is the same as the cross-sectional shape of each of the oil grooves 25 of the resin thrust washer 20B according to the fourth configuration example. Specifically, similarly to the oil groove 25 according to the fourth configuration example, the oil groove 25 according to the sixth configuration example has the bottom portion 251 and a pair of curved wall surfaces 255, each having a substantially S shape, which extend from the bottom portion 251 toward the sliding surface 26. Further, the oil groove 25 according to the sixth configuration example also has the dynamic-pressure guiding wall surface 254, which is linearly inclined and is provided continuously with the curved wall surface 255 on the another side (X2 side in FIG. 22).

As illustrated in FIG. 21, besides the first oil groove 25c and the second oil groove 25d that are connected to form a V-like shape, branching oil grooves 110 are provided at the oil grooves 25. The branching oil grooves 110 are oil grooves connected to the first oil groove 25c and the second oil groove 25d, respectively, in such a manner as to branch therefrom. In a configuration illustrated in FIG. 21, the branching oil groove 110 is connected to each of the first oil groove 25c and the second oil groove 25d in such a manner as to form a lowercase letter "y" shape or a mirror-reversed shape thereof. A radially outer side of each of the branching oil grooves 110 does not communicate with an outer periphery side of the resin thrust washer 20B (ring-shaped portion 21). An oil stop wall 110a is arranged on a radially outer side of each of the branching oil grooves 110 as in the case of the oil grooves 25.

Further, in the configuration illustrated in FIG. 21, the branching oil groove 110 connected to the first oil groove 25c and the branching oil groove 110 connected to the second oil groove 25d are provided to have widths equal to each other. However, two branching oil grooves 110 may be provided to have different widths. For example, the branching oil groove 110 connected to the first oil groove 25c may be provided to have a width wider, or on the contrary, smaller than that of the branching oil groove 110 connected to the second oil groove 25d. Further, the oil stop wall 110a configured to suppress flow of the lubricating oil from an outer periphery side of the branching oil groove 110 is provided on a radially outer side of the branching oil groove 110. A width of the oil stop wall 110a can be set in the same manner as that for the width of the oil stop wall 28 described above.

(4) Seventh Configuration Example of Resin Thrust Washer 20B

Figure 23:
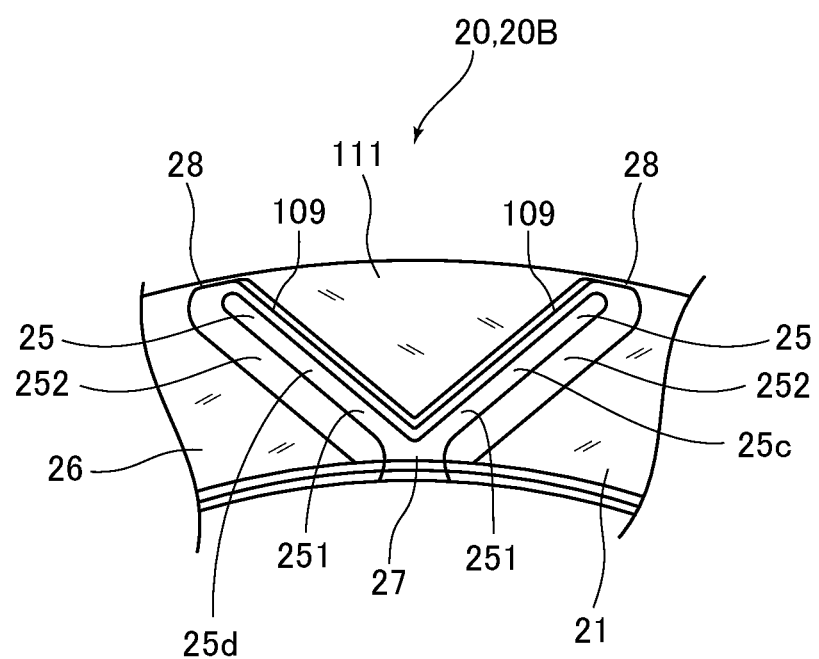
FIG. 23 is a partial plan view for illustrating a configuration of a resin thrust washer according to a seventh configuration example.
Figure 24:
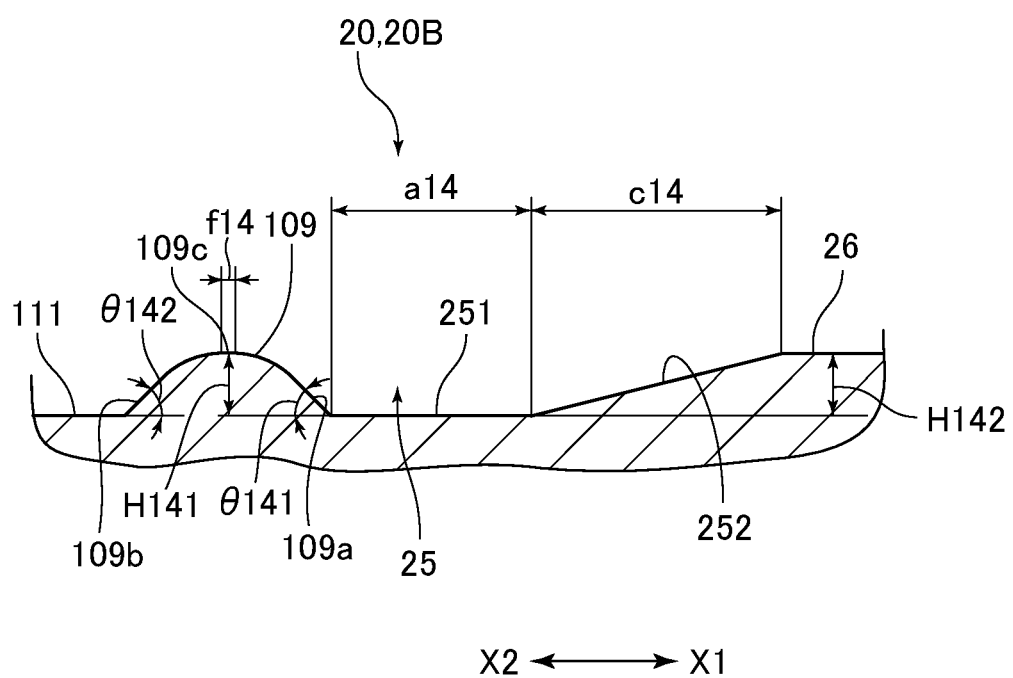
FIG. 24 is a cross-sectional view of an oil groove illustrated in FIG. 23, which is taken along a width direction thereof.

Next, the resin thrust washer 20B according to a seventh configuration example is described. FIG. 23 is a partial plan view for illustrating the configuration of the resin thrust washer 20B according to the seventh configuration example. FIG. 24 is a cross-sectional view of the oil groove 25 illustrated in FIG. 23, which is taken along a width direction thereof. The oil grooves 25 according to the seventh configuration example are different from the oil grooves 25 according to the fourth configuration example in planar shape. However, a configuration of the resin thrust washer 20B according to the seventh configuration example is the same as the configuration of the resin thrust washer 20B according to the fourth configuration example except for the vicinity of the cross-sectional shape of each of the oil grooves 25.

Specifically, as illustrated in FIG. 24, from the bottom portion 251 of the oil groove 25 to one side (X1 side in FIG. 24), the tapered wall surface 252 is reached. Specifically, the tapered wall surface 252 is continuous with the bottom portion 251 on the one side. On the other hand, from the bottom 251 to other side (X2 side in FIG. 24), it reaches an inclined wall portion 109a of an oil weir portion 109. Specifically, the inclined wall portion 109a is continuous with the bottom portion 251 on the another side. In the configuration illustrated in FIG. 24, a dimension is set so that a length (dimension c14) of the tapered wall surface 252 in the width direction is approximately twice a dimension a14, which is a length of the bottom portion 251 in the width direction.

The oil weir portion 109 is provided so that a height H141 from the bottom portion 251 is the same as a height H142 of the sliding surface 26 from the bottom portion 251. The oil weir portion 109 has a pair of inclined wall portions 109a and 109b on both sides of a top portion 109c. The inclined wall portion 109a is, as described above, an inclined wall located on the another side (X2 side) of the oil groove 25, and is linearly inclined. Further, the inclined wall portion 109b is an inclined wall located on a side opposite to the inclined wall portion 109a across the top portion 109c, and similarly to the inclined wall portion 109a, is linearly inclined. As illustrated in FIG. 24, the inclined wall portion 109a is arranged on the one side (X1 side) of the top portion 109c, and the inclined wall portion 109b is arranged on the another side (X2 side) of the top portion 109c. A shape of each of the inclined wall portions 109a and 109b is not limited to be linear, and may be curved.

The bottom portion 251 side of the inclined wall portion 109a and the portion 111 (described later) side of the inclined wall portion 109b are provided linearly. However, the top portion 109c side of the inclined wall portions 109a and 109b is provided in a curved shape.

Further, the top portion 109c is provided to be flat. A width of the top portion 109c is considerably smaller than, for example, a width of the bottom portion 251 and a width of the tapered wall surface 252. The width of the top portion 109c is extremely small as described above. Thus, the top portion 109c is provided in such a manner that, when being brought into contact with another member (such as another resin thrust washer 20, the metal thrust washer, or the mating member C1, C2), linear contact occurs. This point is now described in detail. As illustrated in FIG. 23 and FIG. 24, the surrounded portion 111 is provided between the first oil groove 25c and the second oil groove 25d, and is surrounded by the two oil grooves 25 (two oil stop walls 28). A height level of the surrounded portion 111 is set lower than a height level of the top portion 109c, as illustrated in FIG. 24. Thus, even when the top portion 109c is brought into contact with another member while the resin thrust washer 20 is being rotated, the surrounded portion 111 is not brought into contact with the another member.

While the resin thrust washer 20 is being rotated, the surrounded portion 111 is coated with the lubricating oil, which has passed over the top portion 109c. The surrounded portion 111 is prevented from being brought into contact with the another member even by coating of the surrounded portion 111 with the lubricating oil.

As described above, while the resin thrust washer 20 is being rotated, the surrounded portion 111 having a small height level is not brought into contact with another member. Meanwhile, the top portion 109c may be brought into contact with the another member. Such a configuration enables a reduction in sliding load in comparison to a configuration without the surrounded portions 111. Note that the surrounded portion 111 may have the same height level as a height level of the bottom portion 251, or may have a height level slightly higher or lower than the height level of the bottom portion 251. Further, while the resin thrust washer 20 is being rotated, the top portion 109c is brought into contact with another member in some cases. However, it is apparent that the lubricating oil prevents the top portion 109c from being brought into contact with the another member in some cases.

(5) Eighth Configuration Example of Resin Thrust Washer 20B

Figure 25:
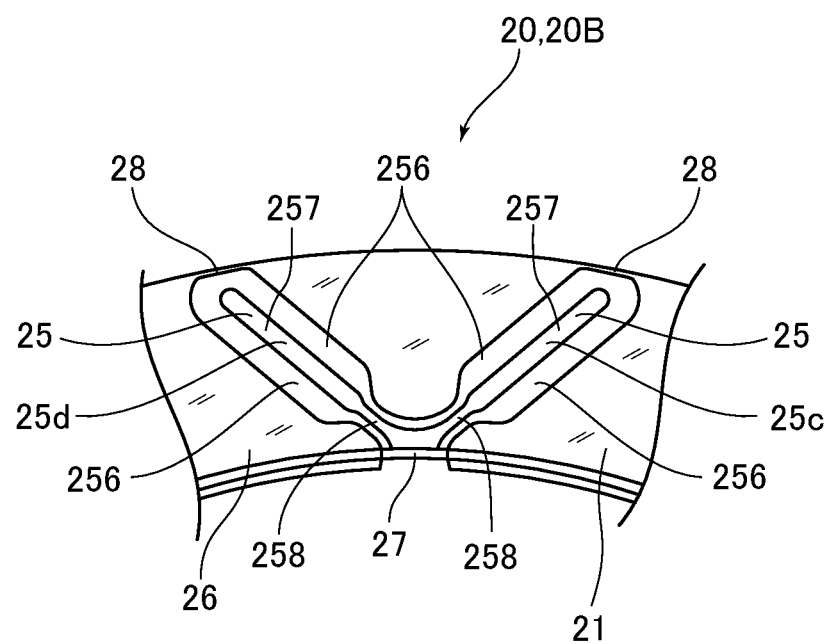
FIG. 25 is a partial plan view for illustrating a configuration of a resin thrust washer according to an eighth configuration example.
Figure 26:
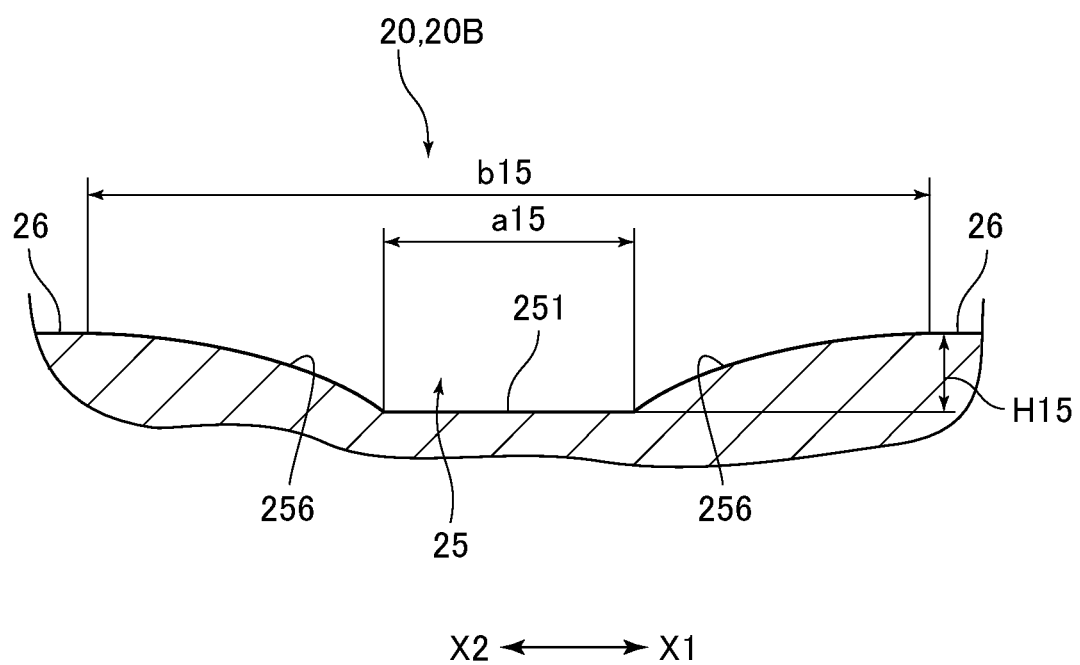
FIG. 26 is a cross-sectional view of an oil groove illustrated in FIG. 25, which is taken along a width direction thereof.

Next, the resin thrust washer 20B according to an eighth configuration example is described. FIG. 25 is a partial plan view for illustrating the configuration of the resin thrust washer 20B according to the eighth configuration example. FIG. 26 is a cross-sectional view of the oil groove 25 illustrated in FIG. 25, which is taken along a width direction thereof. Further, the oil grooves 25 according to the eighth configuration example are different from the oil grooves 25 according to the fourth configuration example in planar shape. In the resin thrust washer 20B according to the eighth configuration example, however, each of the oil grooves 25 has the bottom portion 251 as in the fourth configuration example. Now, differences of the resin thrust washer 20B according to the eighth configuration example from the resin thrust washers 20B according to the fourth to seventh configuration examples are described.

As illustrated in FIG. 26, the resin thrust washer 20B according to the eighth configuration example has projecting curved-surface portions 256 similar to the curved wall surfaces 255 having a substantially S shape. The projecting curved-surface portions 256 is a projecting curved surface that connects the bottom portion 251 and the sliding surface 26 to each other. In contrast to the curved wall surface 255 having a substantially S shape, the projecting curved-surface portion 256 has a cross-sectional shape without an inflection point. In a configuration illustrated in FIG. 26, the projecting curved-surface portion 256 is provided in a shape similar to, for example, a rounded chamfered shape. However, in addition to the projecting curved-surface portion, the projecting curved-surface portion 256 may have, for example, a linear portion, or may have a recessed curved-surface portion. Further, in place of the projecting curved-surface portion 256, a linearly inclined surface similar to the tapered wall surface 252 may be provided.

In a configuration illustrated in FIG. 25, each of the oil grooves 25 has a wide groove portion 257 and a narrow groove portion 258. The wide groove portion 257 and the narrow groove portion 258 are provided so that they are continuous on the same straight line. As illustrated in FIG. 25, the wide groove portion 257 is provided to have a width larger than a width of the narrow groove portion 258. Further, the narrow groove portion 258 is connected to the opening portion 27. Meanwhile, the oil stop wall 28 is provided on a farther side of the wide groove portion 257. Note that, in the configuration illustrated in FIG. 25, dimensions are set so that the width of the wide groove portion 257 is substantially 2 to 2.5 times the width of the narrow groove portion 258.

(6) Ninth Configuration Example of Resin Thrust Washer 20B

Figure 27:
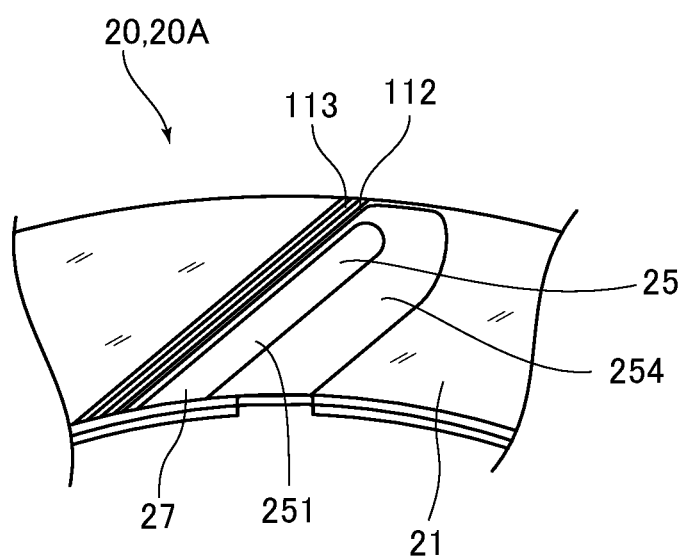
FIG. 27 is a partial plan view for illustrating a configuration of a resin thrust washer according to a ninth configuration example.
Figure 28:
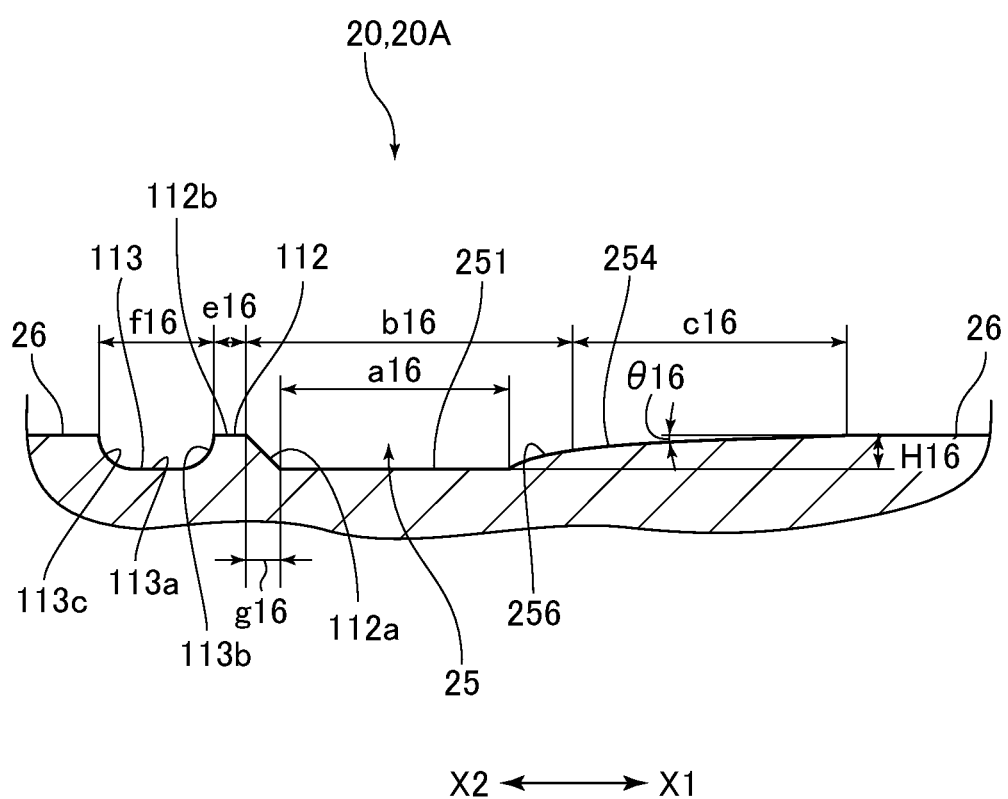
FIG. 28 is a cross-sectional view of an oil groove illustrated in FIG. 27, which is taken along a width direction thereof.

Next, the resin thrust washer 20A according to a ninth configuration example is described. FIG. 27 is a partial plan view for illustrating the configuration of the resin thrust washer 20B according to the ninth configuration example. FIG. 28 is a cross-sectional view of the oil groove 25 illustrated in FIG. 27, which is taken along a width direction thereof. In the resin thrust washer 20A according to the ninth configuration example, in contrast to the resin thrust washers 20B according to the fourth to eighth configuration examples, the oil grooves 25 are not arranged in such a manner that two oil grooves form a V-like shape, but a single oil groove 25 extends in a direction inclined with respect to the radial direction. However, the oil grooves 25 may also be arranged in such a manner that two oil grooves 25 form a V-like shape in the resin thrust washer 20A according to the ninth configuration example.

Similarly to each of the oil grooves 25 according the fourth configuration example, the oil groove 25 according to the ninth configuration example has the bottom portion 251 and the dynamic-pressure guiding wall surface 254. Further, similarly to the oil groove 25 according to the eighth configuration example, the oil groove 25 according to the ninth configuration example has the projecting curved-surface portion 256. However, the resin thrust washer 20B according to the ninth configuration example is provided with a sliding protrusion 112, similar to the oil weir portion 109, from the bottom portion 251 towards the another side (X2 side in FIG. 27 and FIG. 28). The sliding protrusion 112 is a portion to be brought into contact with the mating member C1 or C2 to smooth the roughness of a surface of the mating member C1 or C2. Thus, the sliding protrusion 112 is provided to have the same height level as that of the sliding surface 26, or is provided to slightly protrude with respect to the sliding surface 26. Note that, in place of the projecting curved-surface portion 256, a linearly inclined surface similar to the tapered wall surface 252 may be provided. Further, the sliding protrusion 112 may be provided to have a height level slightly lower than that of the sliding surface 26.

As illustrated in FIG. 27 and FIG. 28, from the bottom portion 251 to the another side (X2 side in FIG. 27 and FIG. 28), an inclined wall portion 112a of the sliding protrusion 112 is reached. Specifically, the inclined wall portion 112a is continuous with the bottom portion 251 on the another side. Further, a top surface portion 112b of the sliding protrusion 112 is continuous with the inclined wall portion 112a. Similarly to the top portion 109c, the top surface portion 112b is provided to be flat. Further, a recessed curved-surface portion 113b described later is continuous with the top surface portion 112b.

Further, in the resin thrust washer 20A according to the ninth configuration example, from the sliding protrusion 112 to the another side (X2 side in FIG. 27 and FIG. 28), the communicating oil groove 113 (corresponding to an adjacent communicating oil groove) is provided. In the connecting oil groove 113, there is no oil stop wall 28 on the radially outer side of the ring-shaped portion 21, and thus the lubricating oil can flow from the insertion hole 22 through the communicating oil groove 113 toward the radially outer side. In a configuration illustrated in FIG. 27 and FIG. 28, the communicating oil groove 113 is provided as a recess in the sliding surface 26 as in the case of the oil groove 25. Further, in the configuration illustrated in FIG. 27 and FIG. 28, the communicating oil groove 113 is provided in a straight line parallel to the oil groove 25. However, the communicating oil groove 113 is not required to be parallel to the oil groove 25, and may be provided, for example, to be extending along the radial direction of the resin thrust washer 20A. Further, the communicating oil groove 113 may be provided in a curved manner instead of straight shape.

A bottom portion 113a of the communicating oil groove 113 is provided to have the same height level as that of the bottom portion 251. However, the bottom portion 113a may have some difference in height level with respect to the height level of the bottom portion 251. Further, as illustrated in FIG. 28, the bottom portion 113a is provided continuously to a pair of recessed curved-surface portions 113b and 113c. Of these, the recessed curved-surface portion 113b is provided on the one side (X1 side in FIG. 28) of the bottom portion 113a, and the recessed curved-surface portion 113c is provided on the another side (X2 side in FIG. 28) of the bottom portion 113a. The recessed curved-surface portions 113b and 113c are recessed curved surfaces that connect the bottom portion 113a and the sliding surface 26 to each other. In contrast to the curved wall surface 255 having a substantially S shape, each of the recessed curved-surface portions 113b and 113c has a cross-sectional shape without an inflection point. In the configuration illustrated in FIG. 28, each of the recessed curved-surface portions 113b and 113c is provided in a shape similar to, for example, a rounded chamfered shape. However, each of the recessed curved-surface portions 113b and 113c may have, for example, a linear portion in addition to the curved-surface portion. Further, the bottom portion 113a may or may not have a curved-surface portion.

When such a communicating oil groove 113 described above is provided, a flow rate of the lubricating oil passing through the communicating oil groove 113 toward the radially outer side can be increased. Thus, the heat radiation property of the resin thrust washer 20A can be improved.

(7) Tenth Configuration Example of Resin Thrust Washer 20B

Next, the resin thrust washer 20B according to a tenth configuration example is described. The resin thrust washer 20B according to the tenth configuration example has the oil grooves 25 similar to those of the above-mentioned resin thrust washer 20B according to the fifth configuration example. Each of the oil grooves 25 similar to those of the resin thrust washer 20B according to the fifth configuration has the bottom portion 251, the curved wall surface 255 having a substantially S shape, and the tapered wall surface 252. Thus, an illustration thereof is omitted. In the tenth configuration example, however, a total of eight sets of the first oil groove 25c and the second oil groove 25d that form a V-like shape are provided at equal intervals in the circumferential direction of the ring-shaped portion 21. In this regard, the tenth configuration example is different from the fifth configuration example in which the ring-shaped portion 21 has a total of six sets of the first oil groove 25c and the second oil groove 25d.

(8) Eleventh Configuration Example of Resin Thrust Washer 20B

Figure 29:
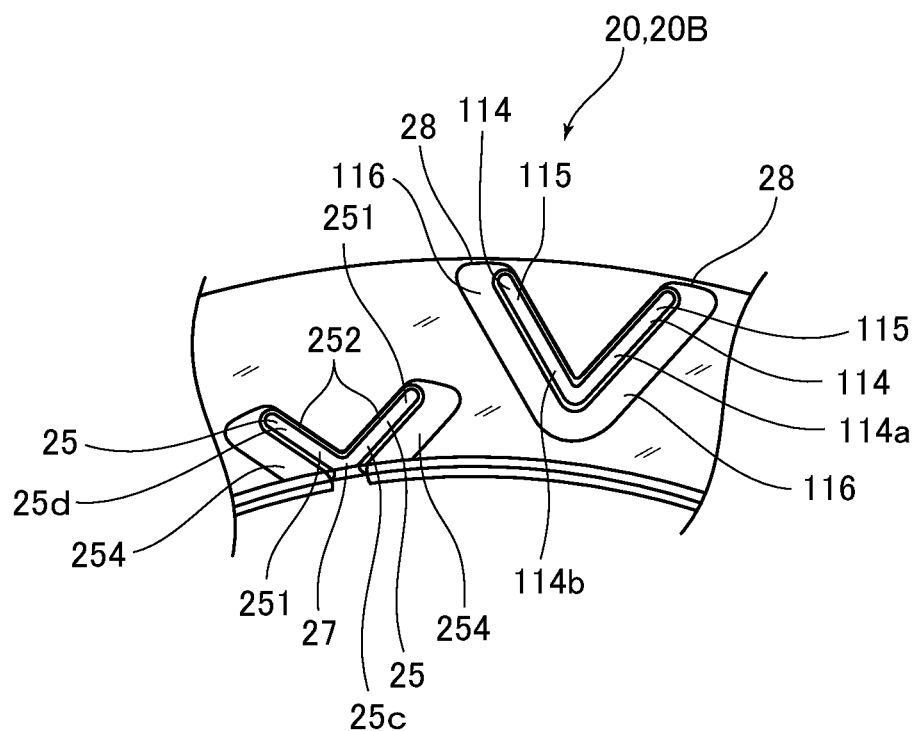
FIG. 29 is a partial plan view for illustrating a configuration of a resin thrust washer according to an eleventh configuration example.
Figure 30:
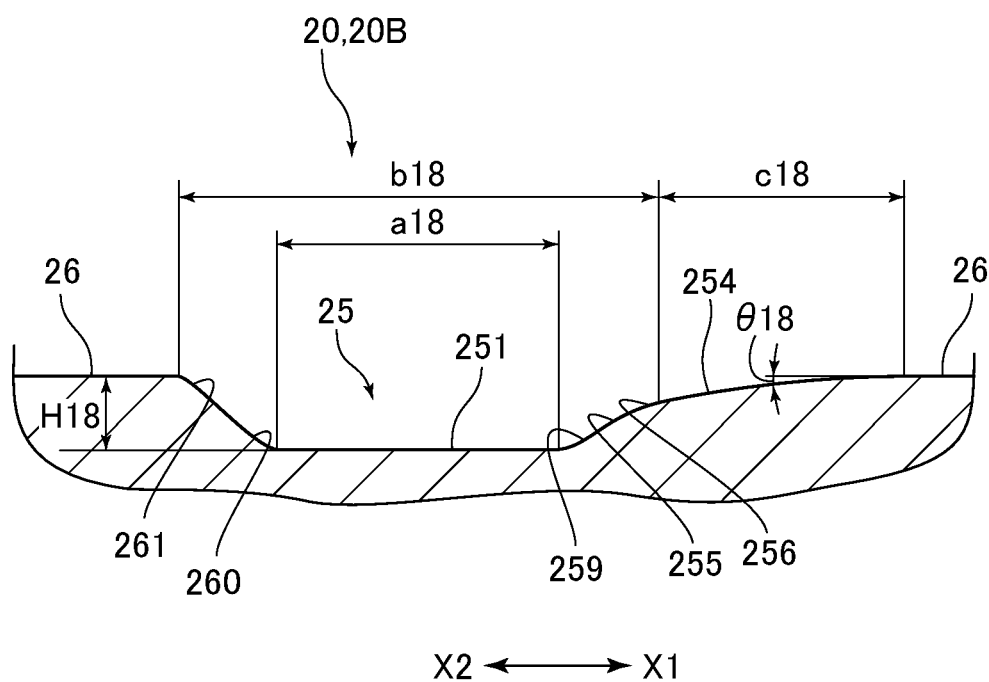
FIG. 30 is a cross-sectional view of an oil groove illustrated in FIG. 29, which is taken along a width direction thereof.

Next, the resin thrust washer 20B according to an eleventh configuration example is described. FIG. 29 is a partial plan view for illustrating the configuration of the resin thrust washer 20B according to the eleventh configuration example. FIG. 30 is a cross-sectional view of the oil groove 25 illustrated in FIG. 29, which is taken along a width direction thereof.

In the resin thrust washer 20B according to the eleventh configuration example, each of the first oil groove 25c and the second oil groove 25d is provided with a reduced length. Thus, a farther side (side away from the opening portion 27) of each of the first oil groove 25c and the second oil groove 25d and an outer peripheral edge portion of the resin thrust washer 20B have a sufficient distance therebetween.

Further, the resin thrust washer 20B according to the eleventh configuration example has, in addition to the oil grooves 25, oil reservoir grooves 114. Each of the oil reservoir grooves 114 is a recessed portion without the opening portion 27 on a radially inner side thereof. In a configuration illustrated in FIG. 29, two oil reservoir grooves 114 are formed. These two oil reservoir grooves 114 are connected on the radially inner side in such a manner as to form a V-like shape. However, the oil reservoir grooves 114 are not required to be arranged in such a manner as to form a V-like shape. In the following description, one of the oil reservoir grooves 114 that form a V-like shape is referred to as "first oil reservoir groove 114a", and another one thereof is referred to as "second oil reservoir groove 114b". The first oil reservoir groove 114a is provided in such a way that it travels in a clockwise direction as it moves from the radially inner side to the radially outer side. On the other hand, the second oil reservoir groove 114b is provided in a counterclockwise direction as it moves from the radially inner side to the radially outer side.

Further, in the eleventh configuration example, with regards to cross-sectional shapes of the oil groove 25 and the oil reservoir groove 114, from the bottom portion 251 of the oil groove 25 towards one side (X1 side in FIG. 30), the curved wall surface 255 having a substantially S shape is reached. Specifically, the curved wall surface 255 having a substantially S shape is continuous with the one side of the bottom portion 251. The curved wall surface 255 is provided with a recessed curved-surface portion 259 which is a curved-surface with recessed shape, and a projecting curved-surface portion 256 which is a curved-surface with projecting shape is provided continuously to the recessed curved-surface portion 259. Further, the dynamic-pressure guiding wall surface 254 is provided between the projecting curved-surface portion 256 and the sliding surface 26 in such a manner as to be continuous therewith. In place of the projecting curved-surface portion 256, a linearly inclined surface similar to the tapered wall surface 252 may be provided.

Meanwhile, towards the other side (X2 side in FIG. 30) from the bottom portion 251, a recessed curved-surface portion 260 is provided in such a way that it is continuous with the bottom portion 251. Further, an inclined wall portion 261, which is linearly inclined, is provided in such a way that it is continuous with the recessed curved-surface portion 260. Note that, the sliding surface 26 is reached from the inclined wall portion 261 towards the other side (X2 side in FIG. 30). The inclined wall portion 261 may be provided in a curved surface shape. Further, the inclined wall portion 261 may have a curved-surface portion.

Further, similarly to the oil groove 25 described above, from a bottom portion 115 of the oil reservoir groove 114 (see FIG. 29) towards one side in the width direction, the sliding surface 26 is reached via a recessed curved-surface portion (not shown) similar to the recessed curved-surface portion 259, a projecting curved-surface portion (not shown) similar to the projecting curved-surface portion 256, and a dynamic-pressure guiding wall surface 116 (see FIG. 29) similar to the dynamic-pressure guiding wall surface 254 Further, from the bottom portion 115 towards another side in the width direction, the sliding surface 26 is reached via a recessed curved-surface portion (not shown) similar to the recessed curved-surface portion 260 and an inclined wall portion (not shown) similar to the inclined wall portion 261. Note that, in place of the projecting curved-surface portion 256, a linearly inclined surface equivalent to the tapered wall surface 252 may be provided.

Figure 31:
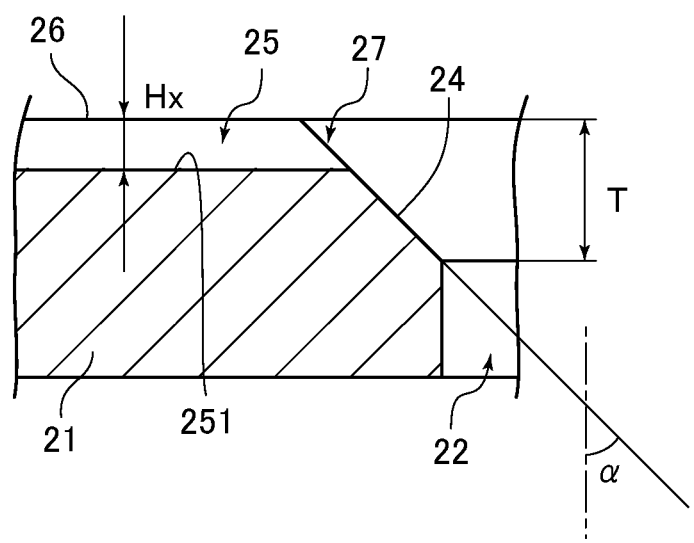
FIG. 31 is a partial cross-sectional view of the resin thrust washer, which is taken along a radial direction of the resin thrust washer, and illustrating the vicinity of an oil scooping surface in an enlarged manner.

In this case, a dimensional relationship between a height (groove depth of the oil groove 25) H1 to H6, H11 to H13, H15, H16, H18, H141, or H142 from the bottom portion 251 to the sliding surface 26 and the oil scooping surface 24 is as illustrated in FIG. 31. Specifically, a height (hereinafter referred to as "height Hx") from the bottom portion 251 to the sliding surface 26 and a height T from an inner peripheral end portion of the oil scooping surface 24 to the sliding surface 26 are set in such a manner that the height T is larger than the height Hx.

In particular, when the thrust washer 10 is rotated, the lubricating oil moves in the circumferential direction along the oil scooping surface 24 to flow from the opening portions 27 into the oil grooves 25. Thus, when the height T is not sufficiently larger than the height Hx, there is a fear in that the amount of lubricating oil flowing from the opening portions 27 into the oil grooves 25 may be reduced. Accordingly, it is preferred that the height T be set to a dimension that is two or more times the height Hx. Further, it is preferred that an inclination angle α of the oil scooping surface 24 with respect to an axial direction of the thrust washer 10 fall within a range of from 30 degrees to 60 degrees. In this case, when the inclination angle α is smaller than 30 degrees, a dimension of the oil scooping surface 24 in the radial direction is decreased to reduce the amount of supply of the lubricating oil. Meanwhile, when the inclination angle α is larger than 60 degrees, a ratio of the oil scooping surface 24 in the radial direction is increased to achieve the above-mentioned state in which the height T is two or more times the height Hx. Further, when the dimension of the oil scooping surface 24 in the radial direction is fixed, the height Hx is reduced (becomes smaller). Thus, it is preferred that the inclination angle α fall within the above-mentioned range. Forty-five degrees, which is a central value in the above-mentioned suitable range of the inclination angle α from 30 degrees to 60 degrees, is given as a representative example of the inclination angle α. However, the inclination angle α can be suitably selected from the angles falling within the above-mentioned range of from 30 degrees to 60 degrees. The inclination angle α is not required to fall within the range of from 30 degrees to 60 degrees.

An inclination angle β (not shown) of a groove bottom portion of the oil introducing groove 23 with respect to the axial direction is set smaller than the inclination angle α of the oil scooping surface 24 as described above. Specifically, the inclination angle β includes 0 degrees (may be 0 degrees), and is set smaller than the inclination angle α. As a result, a boundary wall between the oil introducing groove 23 and the oil scooping surface 24 has a relatively large level difference (see, for example, FIG. 12 and the like). Thus, when the lubricating oil flows into the oil introducing groove 23, the lubricating oil can be suitably supplied to the oil scooping surface 24 side. When the inclination angle β is 0 degrees, the groove bottom portion of the oil guiding groove 23 is in a state of being parallel to the axial direction.

It is preferred that at least a part of the boundary wall of the oil introducing groove 23 between the oil introducing groove 23 and the oil scooping surface 24 be slightly inclined with respect to the radial direction of the thrust washer 10 (ring-shaped portion 21). As an example in which a part of the boundary wall is slightly inclined, there is given the following configuration. Specifically, a connecting portion which is connected to the bottom portion of the oil introducing groove 23 and is located at radially outer side of the oil introducing groove 23 is formed in a round shape. The boundary wall may be provided not only to have a round shape but also in such a manner that a dimension of the boundary wall in the circumferential direction decreases from an inner side toward an outer side of the oil introducing groove 23 in the radial direction.

5. Evaluations (Results of Experiments) of Shapes of Oil Grooves 25 of Resin Thrust Washers 20A and 20B Next, about the resin thrust washers 20A and 20B, evaluations (results of experiments) of shapes of the oil grooves 25 are described below.

(1) Experimental Conditions and Load Measurement Apparatus 300

First, experimental conditions are described. The resin thrust washers 20A, which were subjected to experiments, each had an outer diameter of 67 mm, an inner diameter of 49 mm, and a thickness of 1 mm. Further, each of the resin thrust washers 20A according to the first configuration example and the second configuration example had the oil grooves 25 on one surface. The resin thrust washer 20A according to the third configuration example had the oil grooves 25 on both surfaces. Further, each of the resin thrust washers 20A was manufactured by using 150FC30 (commercial name; manufactured by Victrex Plc) containing a polyether ketone resin (PEK) as a material. Further, the resin thrust washers 20 were not subjected to a surface treatment. The mating members C1 and C2, which were each arranged to be opposed to the resin thrust washer 20A, were manufactured by using S45C (JIS standards), which is a high tensile strength steel. The mating members C1 and C2 have a diameter of 67 mm and have a surface roughness of Rz 0.5 μm. In this experiment, both surfaces of the resin thrust washer 20A were caused to slide against another member. The mating members C1 and C2 against which both surfaces of each of the resin thrust washers 20A were caused to slide had a Vickers hardness (HV) of 180. Further, ATF was used as an oil type of the lubricating oil, and an oil temperature at a time when the experiments were conducted was 120 degrees. Further, at the time of the experiments, a load was set to 1,135 N, a rotation speed was set to 6,800 rpm, and an oil flow rate was set to 100 cc/min.

Figure 32:
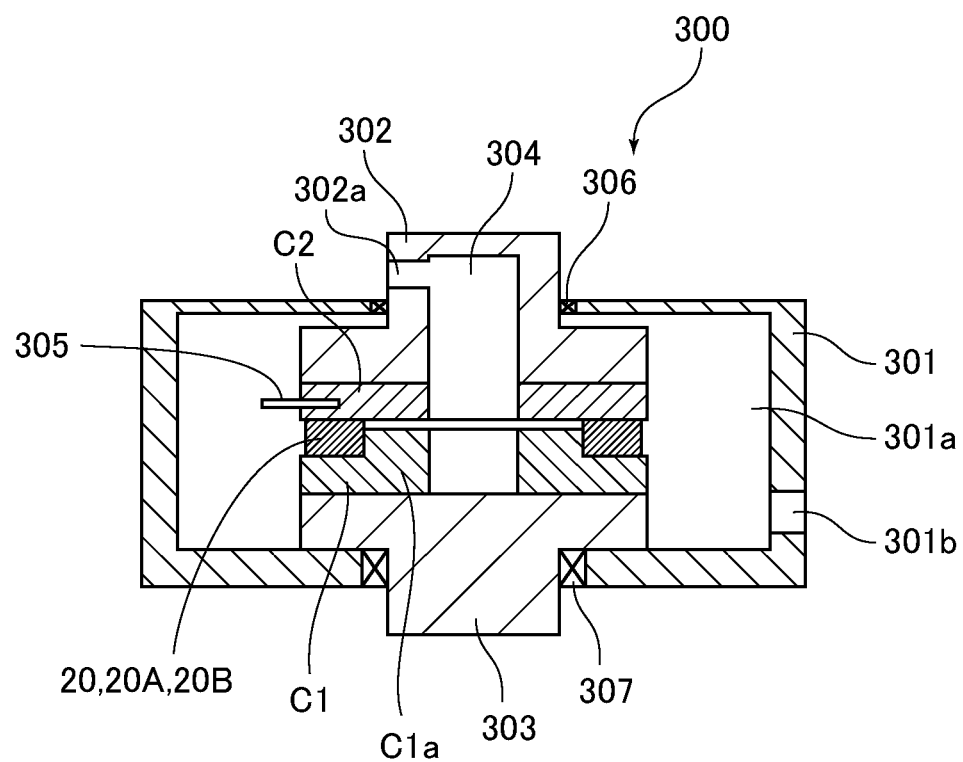
FIG. 32 is a cross-sectional view for illustrating a schematic configuration of a load measurement apparatus.

Further, for the resin thrust washers 20A described above, a sliding load was measured with use of the load measurement apparatus 300 as illustrated in FIG. 32. The load measurement apparatus 300 includes an oil pan 301 having a cylindrical shape. The above-mentioned lubricating oil is supplied to an inner cylindrical portion 301a of the oil pan 301. Further, the oil pan 301 has an oil discharge port 301b. The oil discharge port 301b is an opening portion configured to discharge the lubricating oil in the inner cylindrical portion 301a to an outside, and has a forcibly discharging function with use of a pump.

Further, the load measurement apparatus 300 includes a fixed shaft 302 and a rotary shaft 303. The fixed shaft 302 is a shaft that is not rotated relative to the oil pan 301. However, a load in a pressing direction is applied to the fixed shaft 302 by load application means (not shown). Further, the mating member C2 is mounted to the fixed shaft 302 under a state in which the mating member C2 is not rotated with respect to the fixed shaft 302.

Further, the rotary shaft 303 is a shaft to be rotated with respect to the oil pan 301. Thus, a driving force for causing rotation is applied to the rotary shaft 303 by rotating-force application means (not shown). Further, the mating member C1 is attached to the rotary shaft 303 under a state in which the mating member C1 is not rotated with respect to the rotary shaft 303. One mating member C1 has a shaft-shaped portion C1a for attaching the resin thrust washer 20A thereto. Meanwhile, another mating member C2 is provided in a disc-like shape. Thus, a dimension of the one mating member C1 in an axial direction thereof is set larger than a dimension of the another mating member C2 because of the presence of the shaft-shaped portion C1a.

As illustrated in FIG. 32, a center hole is provided to pass through each of the fixed shaft 302, the mating member C1, and the another mating member C2 (reference symbols thereof are omitted). The center holes are aligned in such a manner as to be continuous in the axial direction to form an oil supply path 304 configured to allow the lubricating oil to flow therethrough. The fixed shaft 302 has an oil supply port 302a, which is an opening portion configured to supply the lubricating oil to the oil supply path 304. Further, a thermocouple 305 is mounted to the mating member C2. The thermocouple 305 is a portion configured to measure a sliding surface temperature of the mating member C2. In the oil pan 301, an oil seal 306 is provided in an opening portion (reference symbol thereof is omitted) which is configured to allow insertion of the fixed shaft 302 into the inner cylindrical portion 301a. Further, in the oil pan 301, an oil seal 307 is also provided in an opening portion which is configured to allow insertion of the rotary shaft 303 into the inner cylindrical portion 301a.

Figure 33:
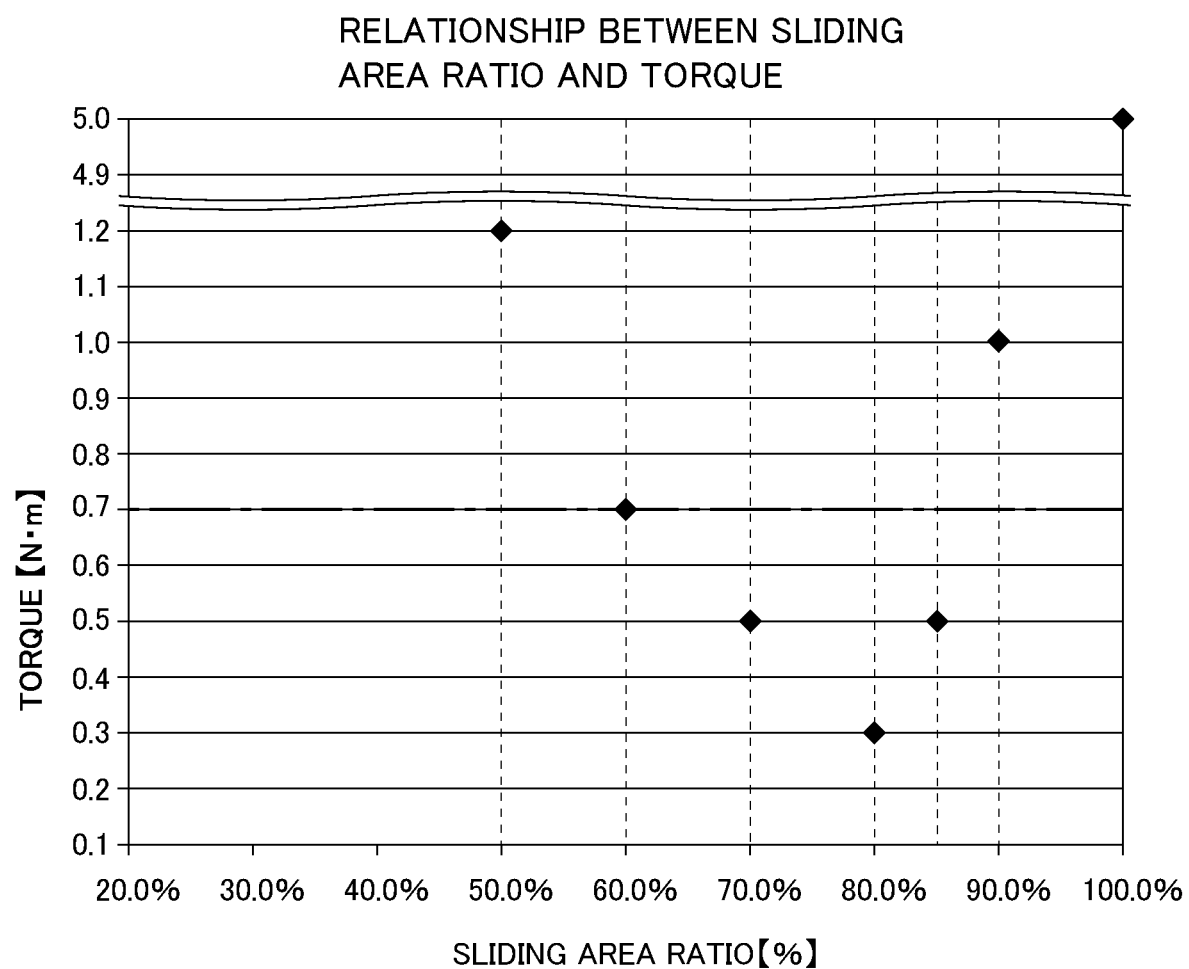
FIG. 33 is a graph for showing results of an experiment on a relationship between a sliding area ratio and a torque (average torque) in the resin thrust washer according to the first configuration example.

(2) Results of Experiment on Sliding Surface Ratio (Oil Groove Area Ratio) of Resin Thrust Washer 20A According to First Configuration Example FIG. 33 indicates the experiment result about the relationship between the sliding surface ratio and a torque (average torque) of the resin thrust washer 20A, the experiment being conducted in a state of attaching the resin thrust washer 20A according to the first configuration example to the load measurement apparatus 300 described above. The experiment shown in FIG. 33 was conducted on the resin thrust washer 20A according to the first configuration example which has the non-communicating oil grooves 25a and the communicating oil grooves 25b as illustrated in FIG. 4. A dimension corresponding to the width of the bottom portion 251 was set to 2.00 mm, a dimension corresponding to the width of the oil grooves 25 was set to 3.50 mm, and a height from the bottom portion 251 to the sliding surface 26 was set to 0.30 mm. This experiment was conducted while the sliding area ratio was varied by changing the number of oil grooves 25 and the groove width thereof.

Among points shown in FIG. 33, a point at the sliding area ratio of 100% (oil groove area ratio of 0%) corresponds to Comparative Example 1, a point at the sliding area ratio of 90% (oil groove area ratio of 10%) corresponds to Comparative Example 2, a point at the sliding area ratio of 85% (oil groove area ratio of 15%) corresponds to Example 1, a point at the sliding area ratio of 80% (oil groove area ratio of 20%) corresponds to Example 2, a point at the sliding area ratio of 70% (oil groove area ratio of 30%) corresponds to Example 3, a point at the sliding area ratio of 60% (oil groove area ratio of 40%) corresponds to Example 4, and a point at the sliding area ratio of 50% (oil groove area ratio of 50%) corresponds to Comparative Example 3.

Torques (sliding loads), abrasion amounts, and results of evaluations thereof (torque evaluation and abrasion amount evaluation), which correspond to the results of the experiment shown in FIG. 33, are shown in Table 1. In the torque evaluation shown in Table 1, the resin thrust washers 20A having a torque (sliding load) of 0.7 N·m or smaller are evaluated as "A" as meeting a criterion of a low sliding load, and the resin thrust washers 20A having a torque (sliding load) larger than 0.7 N·m are evaluated as "B" as failing to meet the criterion of the low sliding load. Further, in the abrasion amount evaluation shown in Table 1, the resin thrust washers 20A having an abrasion amount of 20 μm or smaller are evaluated as "A" as meeting a criterion of a small abrasion amount, and the resin thrust washers 20A having an abrasion amount larger than 20 μm are evaluated as "B" as failing to meet the criterion of the small abrasion amount.

Figure 34:
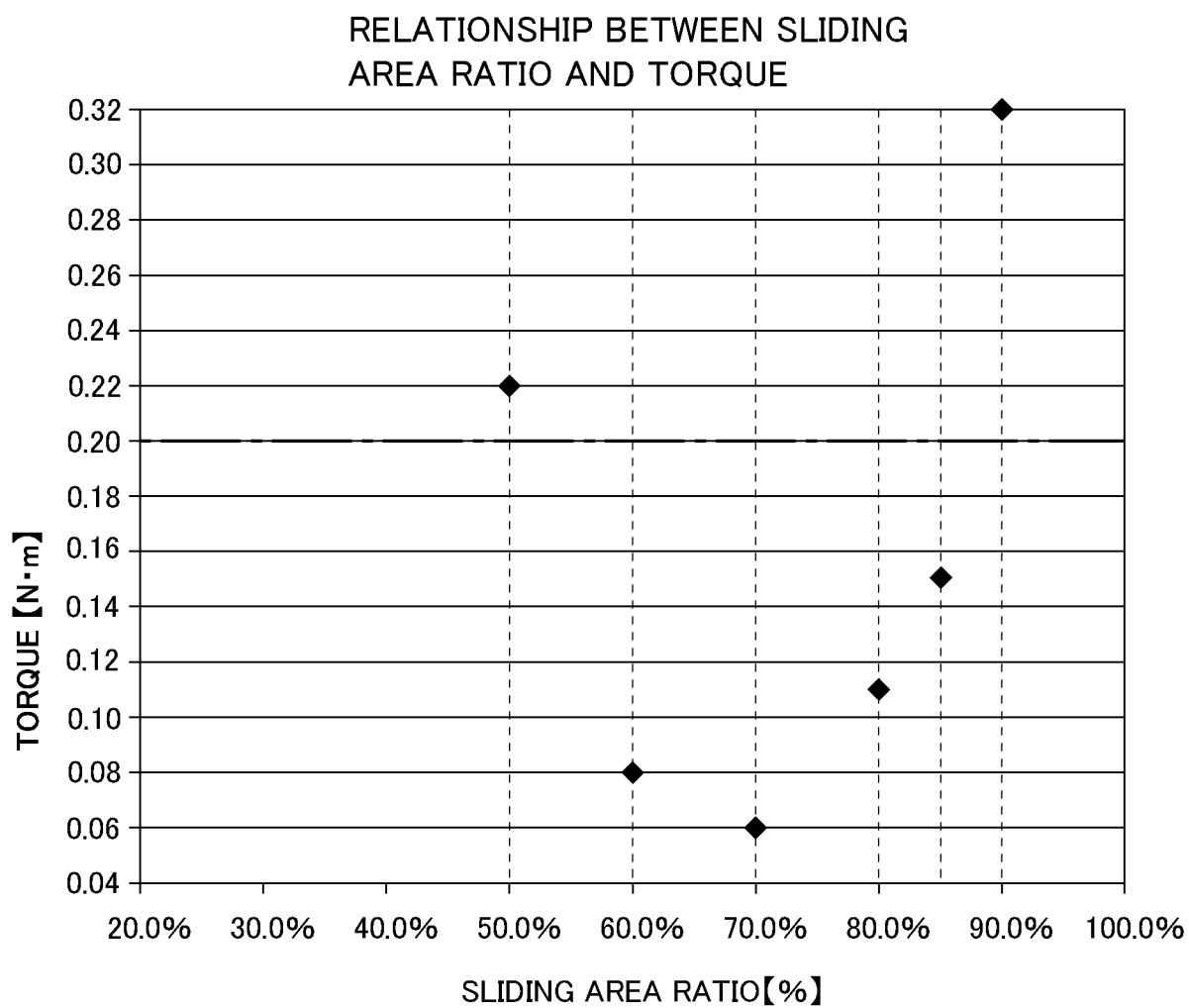
FIG. 34 is a graph for showing results of an experiment on the relationship between the sliding area ratio and the torque (average torque) in the resin thrust washer according to the second configuration example.

(3) Results of Experiment on Sliding Surface Ratio (Oil Groove Area Ratio) of Resin Thrust Washer 20A According to Second Configuration Example FIG. 34 indicates the experiment result about the relationship between the sliding surface ratio and a torque (average torque) of the resin thrust washer 20A, the experiment being conducted in a state of attaching the resin thrust washer 20A according to the second configuration example illustrated in FIG. 11 and FIG. 12 to the load measurement apparatus 300 described above. In this experiment, a dimension corresponding to the width of the bottom portion 251 was set to 0.80 mm, a dimension corresponding to the width of each of the oil grooves 25 was set to 2.10 mm, and a height from the bottom portion 251 to the sliding surface 26 was set to 0.30 mm. This experiment was conducted while the sliding area ratio was varied by changing the number of oil grooves 25 and the groove width thereof. Experimental conditions were set to the same conditions as those for the results of the experiment shown in FIG. 33 and Table 1.

Among points shown in FIG. 34, a point at the sliding area ratio of 90% (oil groove area ratio of 10%) corresponds to Comparative Example 11, a point at the sliding area ratio of 85% (oil groove area ratio of 15%) corresponds to Example 11, a point at the sliding area ratio of 80% (oil groove area ratio of 20%) corresponds to Example 12, a point at the sliding area ratio of 70% (oil groove area ratio of 30%) corresponds to Example 13, a point at the sliding area ratio of 60% (oil groove area ratio of 40%) corresponds to

TABLE 1

|  | Comparative Example 1 | Comparative Example 2 | Example 1 | Example 2 | Example 3 | Example 4 | Comparative Example 3 |
|---|---|---|---|---|---|---|---|
| Sliding Area Ratio (%) | 100 | 90 | 85 | 80 | 70 | 60 | 50 |
| Torque (Sliding Load) (N · m) | 5 | 1 | 0.5 | 0.3 | 0.5 | 0.7 | 1.2 |
| Torque Evaluation | B | B | A | A | A | A | B |
| Abrasion Amount (μm) | 40 | 21 | 5 | 2 | 4 | 15 | 22 |
| Abrasion Amount Evaluation | B | B | A | A | A | A | B |

For the experiment shown in FIG. 33 and Table 1, there are shown the results of the experiment in which each of the resin thrust washers 20A was moved in a sliding manner for five hours.

From the above-mentioned results of the experiment, it is concluded that the sliding area ratio falling within a range of from 60% to 85% (in other words, the oil groove area ratio falling within a range of from 15% to 40%) is preferred because the average torque was reduced to 0.7 N·m or smaller. Further, it is concluded that the sliding area ratio falling within the range of from 60% to 85% (in other words, the oil groove area ratio falling within the range of from 15% to 40%) is preferred because the abrasion amount was reduced to 20 μm or smaller.

For Comparative Examples 1 and 2, it is considered that lubricity of the lubricating oil was degraded because the oil groove area ratio was too small.

Example 14, and a point at the sliding area ratio of 50% (oil groove area ratio of 50%) corresponds to Comparative Example 12.

Torques (sliding loads), abrasion amounts, and results of evaluations thereof (torque evaluation and abrasion amount evaluation), which correspond to the results of the experiment shown in FIG. 34, are shown in Table 2. In the torque evaluation shown in Table 2, the resin thrust washers 20A having a torque (sliding load) of 0.2 N·m or smaller are evaluated as "A" as meeting a criterion of a low sliding load, and the resin thrust washers 20A having a torque (sliding load) larger than 0.2 N·m are evaluated as "B" as failing to meet the criterion of the low sliding load. Further, in the abrasion amount evaluation shown in Table 2, the resin thrust washers 20A having an abrasion amount of 30 μm or smaller are evaluated as "A" as meeting a criterion of a small abrasion amount, and the resin thrust washers 20A having an abrasion amount larger than 30 μm are evaluated as "B" as failing to meet the criterion of the small abrasion amount.

TABLE 2

|  | Comparative Example 11 | Example 11 | Example 12 | Example 13 | Example 14 | Comparative Example 12 |
|---|---|---|---|---|---|---|
| Sliding Area Ratio (%) | 90 | 85 | 80 | 70 | 60 | 50 |
| Torque (Sliding Load) (N·m) | 0.3 | 0.18 | 0.15 | 0.08 | 0.09 | 0.28 |
| Torque Evaluation | B | A | A | A | A | B |
| Abrasion Amount (μm) | 24 | 10 | 2.1 | 0.8 | 1.2 | 20 |
| Abrasion Amount Evaluation | A | A | A | A | A | A |

From the above-mentioned results of the experiment, it is concluded that the sliding area ratio falling within a range of from 60% to 85% (in other words, the oil groove area ratio falling within a range of from 15% to 40%) is preferred because the average torque was reduced to 0.2 N·m or smaller. Further, the abrasion amount was reduced to 20 μm or smaller within the range of the experiment. From the results described above, it is concluded that the resin thrust washer 20A according to the second configuration example, which has the sliding area ratio falling within the range of from 60% to 85% (in other words, the oil groove area ratio falling within the range of from 15% to 40%), is preferred because the criteria of both of the low sliding load and the small abrasion amount are met.

In Comparative Example 11, it is considered that the torque (sliding load) was increased because of increase in shear resistance of the lubricating oil. Further, in Comparative Example 12, the oil groove area ratio was as large as 50%, therefore a contact area was small and a surface pressure of the sliding surface 26 was increased. For the reason described above, it is considered that the torque (sliding load) was increased.

Figure 35:
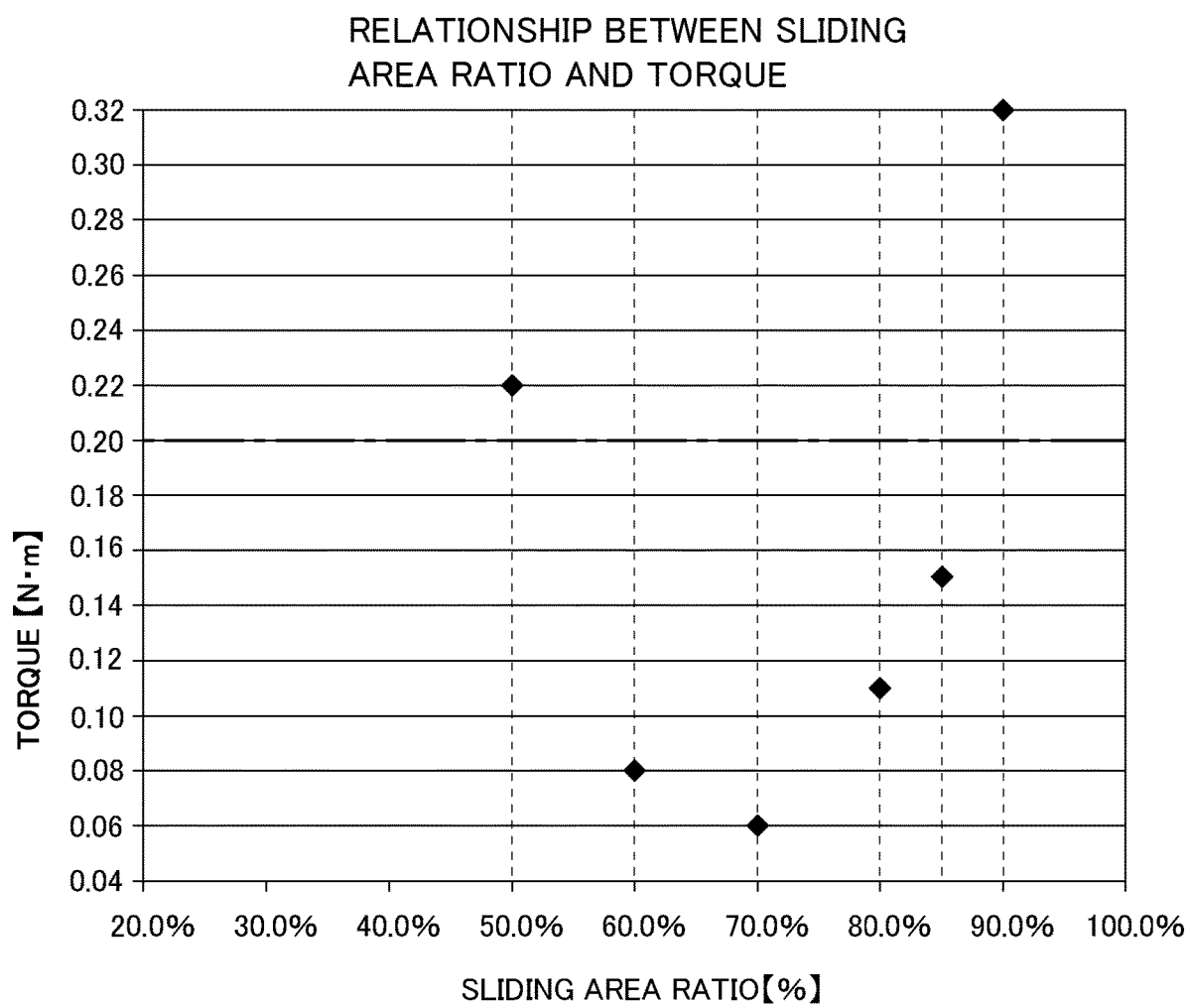
FIG. 35 is a graph for showing results of an experiment on the relationship between the sliding area ratio and the torque (average torque) in the resin thrust washer according to the fourth configuration example.

(4) Results of Experiment on Sliding Area Ratio (Oil Groove Area Ratio) of Resin Thrust Washer 20B According to Fourth Configuration Example Next, the resin thrust washer 20B according to the fourth configuration example as illustrated in FIG. 17 and FIG. 18 was mounted in the load measurement apparatus 300 described above, and an experiment was conducted. In this experiment, results of the experiment were obtained for a relationship between the sliding area ratio and the torque (average torque) of the resin thrust washer 20B. The results of the experiment are shown in FIG. 35. In this experiment, a dimension corresponding to the width of the bottom portion 251 was set to 0.50 mm, a dimension corresponding to the width of each of the oil grooves 25 was set to 1.50 mm, and a height from the bottom portion 251 to the sliding surface 26 was set to 0.25 mm. This experiment was conducted while the sliding area ratio was varied by changing the number of oil grooves 25 and the groove width thereof. Experimental conditions were set to the same conditions as those for the results of the experiment shown in FIG. 18 and Table 1.

Among points shown in FIG. 35, a point at the sliding area ratio of 90% (oil groove area ratio of 10%) corresponds to Comparative Example 21, a point at the sliding area ratio of 85% (oil groove area ratio of 15%) corresponds to Example 21, a point at the sliding area ratio of 80% (oil groove area ratio of 20%) corresponds to Example 22, a point at the sliding area ratio of 70% (oil groove area ratio of 30%) corresponds to Example 23, a point at the sliding area ratio of 60% (oil groove area ratio of 40%) corresponds to Example 24, and a point at the sliding area ratio of 50% (oil groove area ratio of 50%) corresponds to Comparative Example 22.

Torques (sliding loads), abrasion amounts, and results of evaluations thereof (torque evaluation and abrasion amount evaluation), which correspond to the results of the experiment shown in FIG. 35, are shown in Table 3. As an evaluation criterion for the torque evaluation in Table 3, the torque was evaluated as "A" when being equal to or smaller than 0.2 N·m, and was evaluated as "B" when being larger than 0.2 N·m. Further, as an evaluation criterion for the abrasion amount evaluation, the abrasion amount was evaluated as "A" when being equal to or smaller than 30 μm, and was evaluated as "B" when being larger than 30 μm. Thus, the evaluation criteria are the same as those in Table 2.

TABLE 3

|  | Comparative Example 21 | Example 21 | Example 22 | Example 23 | Example 24 | Comparative Example 22 |
|---|---|---|---|---|---|---|
| Sliding Area Ratio (%) | 90 | 85 | 80 | 70 | 60 | 50 |
| Torque (Sliding Load) (N·m) | 0.32 | 0.15 | 0.11 | 0.06 | 0.08 | 0.22 |
| Torque Evaluation | B | A | A | A | A | B |
| Abrasion Amount (μm) | 31 | 5 | 1.9 | 0.5 | 1 | 12.1 |
| Abrasion Amount Evaluation | B | A | A | A | A | A |

From the above-mentioned results of the experiment, it is concluded that the sliding area ratio falling within a range of from 60% to 85% (in other words, the oil groove area ratio falling within a range of from 15% to 40%) is preferred because the average torque was reduced to 0.2 N·m or smaller. Further, it is concluded that the sliding area ratio falling within the range of from 50% to 85% (in other words, the oil groove area ratio falling within the range of from 15% to 50%) is preferred because the abrasion amount was reduced to 30 μm or smaller. From the results described above, it is concluded that the resin thrust washer 20B according to the fourth configuration example, which has the sliding area ratio falling within the range of from 60% to 85% (in other words, the oil groove area ratio falling within the range of from 15% to 40%), is preferred because the criteria of both of the low sliding load and the small abrasion amount are met.

In Comparative Example 21, it is considered that the torque (sliding load) was increased because of increase in shear resistance of the lubricating oil. Further, in Comparative Example 22, the oil groove area ratio was as large as 50%, a contact area was small, and a surface pressure of the sliding surface 26 was increased, it is considered that the torque (sliding load) was increased.

(5) Results of Experiment on Groove Angle in Resin Thrust Washer 20A According to Second Configuration Example with Sliding Area Ratio of 85% (Oil Groove Area Ratio of 15%)

Next, the resin thrust washer 20A according to the second configuration example illustrated in FIG. 11 and FIG. 12 and having the sliding area ratio of 85% (oil groove area ratio of 15%) was mounted in the load measurement apparatus 300 described above, and an experiment was conducted. Results of the experiment are shown in Table 4. In Table 4, there are shown the torque (sliding load), the abrasion amount, and results of evaluations thereof (torque evaluation and abrasion amount evaluation) when a groove angle was changed. In Table 4, a case in which the groove angle of each of the oil grooves 25 was 30 degrees corresponds to Example 31, a case in which the groove angle of each of the oil grooves 25 was 40 degrees corresponds to Example 32, a case in which the groove angle of each of the oil grooves 25 was 45 degrees corresponds to Example 33, a case in which the groove angle of each of the oil grooves 25 was 50 degrees corresponds to Example 34, a case in which the groove angle of each of the oil grooves 25 was 55 degrees corresponds to Example 35, and a case in which the groove angle of each of the oil grooves 25 was 60 degrees corresponds to Example 36.

As an evaluation criterion for the torque evaluation in Table 4, the torque was evaluated as "A" when being equal to or smaller than 0.2 N·m, and was evaluated as "B" when being larger than 0.2 N·m. Further, as an evaluation criterion for the abrasion amount evaluation, the abrasion amount was evaluated as "A" when being equal to or smaller than 30 μm, and was evaluated as "B" when being larger than 30 μm. Thus, the evaluation criteria are the same as those in Table 2.

TABLE 4

|  | Example 31 | Example 32 | Example 33 | Example 34 | Example 35 | Example 36 |
|---|---|---|---|---|---|---|
| Groove Angle (degree) | 30 | 40 | 45 | 50 | 55 | 60 |
| Torque (Sliding Load) (N · m) | 0.2 | 0.18 | 0.18 | 0.17 | 0.18 | 0.2 |
| Torque Evaluation | A | A | A | A | A | A |
| Abrasion Amount (μm) | 14.3 | 6 | 5.1 | 4 | 4.5 | 6.6 |
| Abrasion Amount Evaluation | A | A | A | A | A | A |

From the above-mentioned results of the experiment, a case when the sliding area ratio is 85% (in other words, the oil groove area ratio is 15%) is considered to be preferable because the average torque was reduced to 0.2 N·m or smaller and the abrasion amount was reduced to 30 μm or smaller at a condition of the groove angle of the oil groove 25 being a range of from 30 degrees to 60 degrees. Thus, it is concluded that the groove angle falling within the above-mentioned range is preferred.

(6) Results of Experiment on Groove Angle in Resin Thrust Washer 20A According to Second Configuration Example with Sliding Area Ratio of 70% (Oil Groove Area Ratio of 30%)

Next, the resin thrust washer 20A according to the second configuration example illustrated in FIG. 11 and FIG. 12 and having the sliding area ratio of 70% (oil groove area ratio of 30%) was mounted in the load measurement apparatus 300 described above, and an experiment was conducted. Results of the experiment are shown in Table 5. Table 5 indicates the torque (sliding load), the abrasion amount, and results of evaluations thereof (torque evaluation and abrasion amount evaluation) when a groove angle was changed. In Table 5, a case in which the groove angle of each of the oil grooves 25 was 30 degrees corresponds to Example 41, a case in which the groove angle of each of the oil grooves 25 was 40 degrees corresponds to Example 42, a case in which the groove angle of each of the oil grooves 25 was 45 degrees corresponds to Example 43, a case in which the groove angle of each of the oil grooves 25 was 50 degrees corresponds to Example 44, a case in which the groove angle of each of the oil grooves 25 was 55 degrees corresponds to Example 45, and a case in which the groove angle of each of the oil grooves 25 was 60 degrees corresponds to Example 46.

As an evaluation criterion for the torque evaluation in Table 5, the torque was evaluated as "A" when being equal to or smaller than 0.2 N·m, and was evaluated as "B" when being larger than 0.2 N·m. Further, as an evaluation criterion for the abrasion amount evaluation, the abrasion amount was evaluated as "A" when being equal to or smaller than 30 μm, and was evaluated as "B" when being larger than 30 μm. Thus, the evaluation criteria are the same as those in Table 2.

TABLE 5

|  | Example 41 | Example 42 | Example 43 | Example 44 | Example 45 | Example 46 |
|---|---|---|---|---|---|---|
| Groove Angle (degree) | 30 | 40 | 45 | 50 | 55 | 60 |
| Torque (Sliding Load) (N · m) | 0.19 | 0.09 | 0.07 | 0.08 | 0.08 | 0.1 |
| Torque Evaluation | A | A | A | A | A | A |
| Abrasion Amount (μm) | 12.8 | 1.2 | 0.8 | 2 | 3.5 | 5 |
| Abrasion Amount Evaluation | A | A | A | A | A | A |

From the above-mentioned results of the experiment, a case when the sliding area ratio is 70% (in other words, the oil groove area ratio is 30%) is considered to be preferable because the average torque was reduced to 0.2 N·m or smaller and the abrasion amount was reduced to 30 μm or smaller at a condition of the groove angle being a range from 30 degrees to 60 degrees.

(7) Results of Experiment on Groove Angle in Resin Thrust Washer 20A According to Second Configuration Example with Sliding Area Ratio of 60% (Oil Groove Area Ratio of 40%)

Next, the resin thrust washer 20A according to the second configuration example illustrated in FIG. 11 and FIG. 12 and having the sliding area ratio of 60% (oil groove area ratio of 40%) was mounted in the load measurement apparatus 300 described above, and an experiment was conducted. Results of the experiment are shown in Table 6. In Table 6 indicates the torque (sliding load), the abrasion amount, and results of evaluations thereof (torque evaluation and abrasion amount evaluation) when a groove angle was changed. In Table 6, a case in which the groove angle of each of the oil grooves 25 was 30 degrees corresponds to Example 51, a case in which the groove angle of each of the oil grooves 25 was 40 degrees corresponds to Example 52, a case in which the groove angle of each of the oil grooves 25 was 45 degrees corresponds to Example 53, a case in which the groove angle of each of the oil grooves 25 was 50 degrees corresponds to Example 54, a case in which the groove angle of each of the oil grooves 25 was 55 degrees corresponds to Example 55, and a case in which the groove angle of each of the oil grooves 25 was 60 degrees corresponds to Example 56.

As an evaluation criterion for the torque evaluation in Table 6, the torque was evaluated as "A" when being equal to or smaller than 0.2 N·m, and was evaluated as "B" when being larger than 0.2 N·m. Further, as an evaluation criterion for the abrasion amount evaluation, the abrasion amount was evaluated as "A" when being equal to or smaller than 30 μm, and was evaluated as "B" when being larger than 30 μm. Thus, the evaluation criteria are the same as those in Table 2.

TABLE 6

|  | Example 51 | Example 52 | Example 53 | Example 54 | Example 55 | Example 56 |
|---|---|---|---|---|---|---|
| Groove Angle (degree) | 30 | 40 | 45 | 50 | 55 | 60 |
| Torque (Sliding Load) (N · m) | 0.2 | 0.12 | 0.09 | 0.1 | 0.1 | 0.12 |
| Torque Evaluation | A | A | A | A | A | A |
| Abrasion Amount (μm) | 8.1 | 1.8 | 1.2 | 2.5 | 3.4 | 5 |
| Abrasion Amount Evaluation | A | A | A | A | A | A |

From the above-mentioned results of the experiment, a case when the sliding area ratio is 60% (specifically, the oil groove area ratio is 40%) is considered to be preferable because the average torque was reduced to 0.2 N·m or smaller and the abrasion amount was reduced to 30 μm or smaller at a condition of the groove angle being a range of from 30 degrees to 60 degrees.

(8) Results of Experiment on Groove Angle in Resin Thrust Washer 20A According to Fourth Configuration Example with Sliding Area Ratio of 85% (Oil Groove Area Ratio of 15%)

Next, the resin thrust washer 20B according to the fourth configuration example illustrated in FIG. 17 and FIG. 18 and having the sliding area ratio of 85% (oil groove area ratio of 15%) was mounted in the load measurement apparatus 300 described above, and an experiment was conducted. Results of the experiment are shown in Table 7. Table 7 indicates the torque (sliding load), the abrasion amount, and results of evaluations thereof (torque evaluation and abrasion amount evaluation) when a groove angle was changed. In Table 7, a case in which the groove angle of each of the oil grooves 25 was 30 degrees corresponds to Example 61, a case in which the groove angle of each of the oil grooves 25 was 40 degrees corresponds to Example 62, a case in which the groove angle of each of the oil grooves 25 was 45 degrees corresponds to Example 63, a case in which the groove angle of each of the oil grooves 25 was 50 degrees corresponds to Example 64, a case in which the groove angle of each of the oil grooves 25 was 55 degrees corresponds to Example 65, and a case in which the groove angle of each of the oil grooves 25 was 60 degrees corresponds to Comparative Example 61.

As an evaluation criterion of the torque evaluation in Table 7, the torque is evaluated as "A" when being equal to or smaller than 0.2 N·m, is evaluated as "B" when being larger than 0.2 N·m, and is evaluated as "C" when manufacture of the resin thrust washer 20A is impossible. Further, as an evaluation criterion of the abrasion amount evaluation, the abrasion amount is evaluated as "A" when being equal to or smaller than 30 μm, is evaluated as "B" when being larger than 30 μm, and is evaluated as "C" when the manufacture of the resin thrust washer 20A is impossible. Thus, the evaluation criteria are the same as those in Table 2. As results of the torque evaluation and the abrasion amount evaluation in Table 7, no evaluation "B" but only the evaluations "A" and "C" are found.

TABLE 7

|  | Example 61 | Example 62 | Example 63 | Example 64 | Example 65 | Comparative Example 61 |
|---|---|---|---|---|---|---|
| Groove Angle (degree) | 30 | 40 | 45 | 50 | 55 | 60 |
| Torque (Sliding Load) (N · m) | 0.19 | 0.16 | 0.15 | 0.2 | 0.2 | Impossible to manufacture |
| Torque Evaluation | A | A | A | A | A | C |
| Abrasion Amount (μm) | 14.3 | 5.5 | 5 | 14.1 | 15.4 | Impossible to manufacture |
| Abrasion Amount Evaluation | A | A | A | A | A | C |

In the above-mentioned results of the experiment, in a case in which the sliding area ratio was 85% (in other words, the oil groove area ratio was 15%) in the resin thrust washer 20B having the oil grooves 25 connected to form a substantially V shape was evaluated as "impossible to manufacture" because, when the groove angle was 60 degrees as in Comparative Example 61, the oil groove 25 interfered with another one of the oil grooves 25. However, a case when the groove angle of the oil groove 25 falls within a range of from 30 degrees to 55 degrees is considered to be preferable because the average torque was reduced to 0.2 N·m or smaller, and the abrasion amount was reduced to 30 μm or smaller.

(9) Results of Experiment on Groove Angle in Resin Thrust Washer 20B According to Fourth Configuration Example with Sliding Area Ratio of 70% (Oil Groove Area Ratio of 30%)

Next, the resin thrust washer 20B according to the fourth configuration example illustrated in FIG. 17 and FIG. 18 and having the sliding area ratio of 70% (oil groove area ratio of 30%) was mounted in the load measurement apparatus 300 described above, and an experiment was conducted. Results of the experiment are shown in Table 8. In Table 8 indicates the torque (sliding load), the abrasion amount, and results of evaluations thereof (torque evaluation and abrasion amount evaluation) when a groove angle was changed. In Table 8, a case in which the groove angle of each of the oil grooves 25 was 30 degrees corresponds to Example 71, a case in which the groove angle of each of the oil grooves 25 was 40 degrees corresponds to Example 72, a case in which the groove angle of each of the oil grooves 25 was 45 degrees corresponds to Example 73, a case in which the groove angle of each of the oil grooves 25 was 50 degrees corresponds to Example 74, a case in which the groove angle of each of the oil grooves 25 was 55 degrees corresponds to Example 75, and a case in which the groove angle of each of the oil grooves 25 was 60 degrees corresponds to Comparative Example 71.

As an evaluation criterion of the torque evaluation in Table 8, the torque is evaluated as "A" when being equal to or smaller than 0.2 N·m, is evaluated as "B" when being larger than 0.2 N·m, and is evaluated as "C" when manufacture of the resin thrust washer 20B is impossible. Further, as an evaluation criterion of the abrasion amount evaluation, the abrasion amount is evaluated as "A" when being equal to or smaller than 30 μm, is evaluated as "B" when being larger than 30 μm, and is evaluated as "C" when the manufacture of the resin thrust washer 20B is impossible. Thus, the evaluation criteria are the same as those in Table 2. As results of the torque evaluation and the abrasion amount evaluation, no evaluation "B" but only the evaluations "A" and "C" are found in Table 8.

In the above-mentioned results of the experiment, in a case in which the sliding area ratio was 70% (specifically, the oil groove area ratio was 30%) in the resin thrust washer 20B having the oil grooves 25 connected to form a substantially V shape, when the groove angle was 60 degrees as in Comparative Example 71, the oil groove 25 interfered with another one of the oil grooves 25. Thus, such a resin thrust washer 20B was evaluated as "impossible to manufacture". However, a case when the groove angle of the oil groove 25 falls within a range of from 30 degrees to 55 degrees is preferred because the average torque was reduced to 0.2 N·m or smaller and the abrasion amount was reduced to 30 μm or smaller.

(10) Results of Experiment on Groove Angle in Resin Thrust Washer 20B According to Fourth Configuration Example with Sliding Area Ratio of 60% (Oil Groove Area Ratio of 40%)

Next, the resin thrust washer 20B according to the fourth configuration example illustrated in FIG. 17 and FIG. 18 and having the sliding area ratio of 60% (oil groove area ratio of 40%) was mounted in the load measurement apparatus 300 described above, and an experiment was conducted. Results of the experiment are shown in Table 9. In Table 9, there are shown the torque (sliding load), the abrasion amount, and results of evaluations thereof (torque evaluation and abrasion amount evaluation) when a groove angle was changed. In Table 9, a case in which the groove angle of each of the oil grooves 25 was 30 degrees corresponds to Example 81, a case in which the groove angle of each of the oil grooves 25 was 40 degrees corresponds to Example 82, a case in which the groove angle of each of the oil grooves 25 was 45 degrees corresponds to Example 83, a case in which the groove angle of each of the oil grooves 25 was 50 degrees corresponds to Example 84, a case in which the groove angle of each of the oil grooves 25 was 55 degrees corresponds to Example 85, and a case in which the groove angle of each of the oil grooves 25 was 60 degrees corresponds to Comparative Example 81.

As an evaluation criterion of the torque evaluation in Table 9, the torque is evaluated as "A" when being equal to or smaller than 0.2 N·m, is evaluated as "B" when being larger than 0.2 N·m, and is evaluated as "C" when manufacture of the resin thrust washer 20B is impossible. Further, as an evaluation criterion of the abrasion amount evaluation, the abrasion amount is evaluated as "A" when being equal to or smaller than 30 μm, is evaluated as "B" when being larger than 30 μm, and is evaluated as "C" when the manufacture of the resin thrust washer 20B is impossible. Thus, the evaluation criteria are the same as those in Table 2. As results of the torque evaluation and the abrasion amount evaluation, no evaluation "B" but only the evaluations "A" and "C" are found in Table 9.

TABLE 8

|  | Example 71 | Example 72 | Example 73 | Example 74 | Example 75 | Comparative Example 71 |
| --- | --- | --- | --- | --- | --- | --- |
| Groove Angle (degree) | 30 | 40 | 45 | 50 | 55 | 60 |
| Torque (Sliding Load) (N · m) | 0.18 | 0.1 | 0.06 | 0.1 | 0.17 | Impossible to manufacture |
| Torque Evaluation | A | A | A | A | A | C |
| Abrasion Amount (μm) | 5.9 | 1.5 | 0.5 | 1.5 | 1.8 | Impossible to manufacture |
| Abrasion Amount Evaluation | A | A | A | A | A | C |

TABLE 9

|  | Example 81 | Example 82 | Example 83 | Example 84 | Example 85 | Comparative Example 81 |
|---|---|---|---|---|---|---|
| Groove Angle (degree) | 30 | 40 | 45 | 50 | 55 | 60 |
| Torque (Sliding Load) (N · m) | 0.11 | 0.1 | 0.08 | 0.16 | 0.17 | Impossible to manufacture |
| Torque Evaluation | A | A | A | A | A | C |
| Abrasion Amount (μm) | 2.8 | 1.5 | 1 | 2.9 | 3.5 | Impossible to manufacture |
| Abrasion Amount Evaluation | A | A | A | A | A | C |

In the above-mentioned results of the experiment, in a case in which the sliding area ratio was 60% (in other words, the oil groove area ratio was 40%) in the resin thrust washer 20B having the oil grooves 25 connected to form a substantially V shape was evaluated as "impossible to manufacture" because, when the groove angle was 60 degrees as in Comparative Example 81, the oil groove 25 interfered with another one of the oil grooves 25. However, a case where the groove angle of the oil groove 25 fell within a range of from 30 degrees to 55 degrees is preferred because the average torque was reduced to 0.2 N·m or smaller, and the abrasion amount was reduced to 30 μm or smaller.

(11) Results of Experiment when Oil Grooves 25 are Formed in Both Surfaces of Resin Thrust Washers 20A and 20B According to Third and Fifth to Eleventh Configuration Examples Next, the resin thrust washers 20A and 20B according to the third and fifth to eleventh configuration examples, which had the oil grooves formed in both surfaces, were mounted in the load measurement apparatus 300 described above, and an experiment was conducted. This experiment was conducted on the resin thrust washers 20A and 20B, each having the sliding area ratio of 70% (oil groove area ratio of 30%) and the groove angle of 45 degrees. The results of the experiment are shown in Table 10. Table 10 indicates the torque (sliding load), the abrasion amount, and evaluation results thereof (torque evaluation and abrasion amount evaluation) when different resin thrust washers 20A and 20B were mounted.

In Table 10, the resin thrust washer 20A according to the third configuration example corresponds to Example 91, the resin thrust washer 20A according to the fifth configuration example corresponds to Example 92, the resin thrust washer 20A according to the sixth configuration example corresponds to Example 93, the resin thrust washer 20A according to the seventh configuration example corresponds to Example 94, the resin thrust washer 20A according to the eighth configuration example corresponds to Example 95, the resin thrust washer 20A according to the ninth configuration example corresponds to Example 96, the resin thrust washer 20A according to the tenth configuration example corresponds to Example 97, and the resin thrust washer 20A according to the eleventh configuration example corresponds to Example 98.

As an evaluation criterion of the torque evaluation in Table 10, the torque is evaluated as "A" when being equal to or smaller than 0.6 N·m, is evaluated as "B" when being larger than 0.6 N·m, and is evaluated as "C" when manufacture of the resin thrust washer 20A is impossible. Further, as an evaluation criterion of the abrasion amount evaluation, the abrasion amount is evaluated as "A" when being equal to or smaller than 30 μm, and is evaluated as "B" when being larger than 30 μm.

TABLE 10

|  | Example 91 | Example 92 | Example 93 | Example 94 | Example 95 | Example 96 | Example 97 | Example 98 |
|---|---|---|---|---|---|---|---|---|
| Sliding Area Ratio (%) | 70 | 70 | 70 | 70 | 70 | 70 | 70 | 70 |
| Groove Angle (degree) | 45 | 45 | 45 | 45 | 45 | 45 | 45 | 45 |
| Torque (Sliding Load) (N · m) | 0.41 | 0.37 | 0.41 | 0.51 | 0.37 | 0.51 | 0.39 | 0.55 |
| Torque Evaluation | A | A | A | A | A | A | A | A |
| Abrasion Amount (μm) | 0 | 0 | 0 | 0.5 | 0 | 0.4 | 0 | 0.7 |
| Abrasion Amount Evaluation | A | A | A | A | A | A | A | A |

In the above-mentioned results of the experiment, the average torque was reduced to 0.6 N·m or smaller and the abrasion amount was reduced to 30 μm or smaller in all of the resin thrust washers 20A and 20B according to the third and fifth to eleventh configuration examples, each having the oil grooves 25 formed in both surfaces. Thus, it is concluded that the above-mentioned resin thrust washers 20A and 20B, each having the oil grooves 25 in both surfaces, are preferred.

6. Actions and Effects

The resin thrust washer 20 having the configuration as described above is provided with the sliding surface 26 on a front surface and a back surface of the ring-shaped portion 21, the front surface and the back surface slide with another member (mating member C1, C2 or another thrust washer), and is provided with the oil grooves 25 which is recessed from the sliding surface 26 on at least one of the front surface and back surface of the ring-shaped portion 21 and into which lubricating oil flowing thereinto. In the oil groove 25, on an inner peripheral end side of the ring-shaped portion 21, the opening portion 27 is provided which is recessed with respect to the sliding surface 26 and is configured to allow the lubricating oil to flow into the oil grooves 25 from the insertion hole 22 side. At an outer circumferential end portion of the ring-shaped portion 21 of at least one of the oil grooves 25, an oil stop wall 28 which is configured to separate the oil groove 25 and an outside of the ring-shaped portion 21 from each other and suppress flow of the lubricating oil flowed into the oil groove 25 to an outer periphery side of the ring-shaped portion 21 is provided. A position of the oil stop wall 28 in a thickness direction of the resin thrust washer 20 is provided at substantially the same position of the sliding surface 26, and the oil groove area ratio is set to fall within a range of from 15% to 40%.

Thus, the oil stop walls 28 prevent the lubricating oil flowed into the oil grooves 25 from flowing to the outer periphery side of the resin thrust washer 20. Hence, an oil film of the lubricating oil can easily be formed between a surface side of the resin thrust washer 20, on which the oil grooves 25 are formed, and another member (mating member C1, C2, or another thrust washer). Further, the oil groove area ratio is set to fall within the range of from 15% to 40%. Thus, as is apparent from the results of the experiments indicates in Table 32 to Table 34 and Table 1 to Table 10, the sliding load can be reduced between the surface side of the resin thrust washer 20, on which the oil grooves 25 are formed, and the another member (mating member C1, C2 or another thrust washer).

Further, in this embodiment, at an intersection position in which the center line L2 of the oil groove 25 and a center line L1 in the radial direction of the ring-shaped portion 21 intersect each other, an inclination angle θ1 between the center line L2 of the of groove 25 and a radial line L3 that passes through the intersection position along the radial direction is preferably set to fall within a range of from 30 degrees to 55 degrees.

With the configuration described above, as is apparent from the results of the experiments shown in Table 1 to Table 10, the abrasion amount and the average torque (sliding load) of the resin thrust washer 20A can be further reduced.

Further, in this embodiment, it is preferred that the dynamic-pressure guiding wall surface 254 be formed adjacent to each of the oil grooves 25, which is configured to guide the lubricating oil flowed into the corresponding oil groove 25 to the sliding surface 26 to generate dynamic pressure between the sliding surface 26 and another member (mating member C1, C2 or another thrust washer).

As described above, when the dynamic-pressure guiding wall surface 254 as illustrated in FIG. 15 and FIG. 16 is provided adjacent to the oil groove 25, the average torque (sliding load) of the resin thrust washer 20A can be further reduced.

Further, in this embodiment, the oil grooves 25 preferably include the first oil grooves 25c being inclined to one side with respect to the radial direction of the ring-shaped portion 21 and the second oil grooves 25d being inclined to another side different from the one side with respect to the radial direction of the ring-shaped portion 21, and the first oil groove 25c and the second oil groove 25d are preferably connected at the opening portion 27.

In the configuration described above, the first oil groove 25c and the second oil groove 25d are inclined toward the one side and the another side with respect to the radial direction, respectively. Thus, an oil film of the lubricating oil can easily be formed between a surface side of the resin thrust washer 20B, on which the oil grooves 25 are formed and another member (mating member C1, C2, or another thrust washer) regardless of whether the resin thrust washer 20B is rotated in the clockwise direction or the counterclockwise direction. Thus, the sliding load can be reduced between the surface side of the resin thrust washer 20B, on which the oil grooves 25 are formed, and the another member (mating member C1, C2, or another thrust washer) regardless of the rotating direction of the resin thrust washer 20B.

Further, in this embodiment, each of the first oil grooves 25c and each of the second oil grooves 25d preferably has a bottom portion 251, which is located at the lowest position with respect to the sliding surface 26, each of the first oil groove 25c and the second oil groove 25d preferably have a tapered wall surface 252 being linearly inclined toward the sliding surface 26 on an outer side position which is not surrounded by the first oil groove 25c and the second oil groove 25d, and each of the tapered wall surfaces 252 is preferably provided with a larger width than the width of the bottom portion 251.

With the configuration described above, the lubricating oil flowed into the oil groove 25 is guided to the sliding surface 26 by the tapered wall surface 252 having a large width. Thus, the sliding load between the resin thrust washer 20 and another member (mating member C1, C2 or another thrust washer) can be further reduced.

Further, in this embodiment, each of the first oil grooves 25c and each of the second oil grooves 25d preferably has the curved wall surface 255, which extends from the bottom portion 251 toward the sliding surface 26 and is curved to have an inflection point.

With the configuration described above, the lubricating oil flowed into the oil groove 25 is guided to the sliding surface 26 by the curved wall surface 255. Thus, the sliding load between the resin thrust washer 20 and another member (mating member C1, C2 or another thrust washer) can be further reduced.

6. Modification Example

In the above, description is made of the embodiment of the present invention. However, the present invention can be variously modified to modes other than those described above. Now, description is made of the modification.

In the embodiment described above, the oil grooves 25 are provided with the same shaped oil grooves 25 in the front surface and the back surface of one resin thrust washer 20. However, the oil grooves 25 formed in the front surface and the back surface of one resin thrust washer 20 may have different shapes. Further, at least one of the oil grooves 25 formed in the resin thrust washer 20 for forming the combined thrust washer 10 may have a shape different from those of the other ones. For example, the shapes of the oil grooves 25 may be changed so that an appropriate amount of lubricating oil is supplied in accordance with a surface roughness of a surface of the resin thrust washer 20, the metal thrust washer, or the mating member C1, C2, which is opposed to the sliding surface 26 having the oil grooves 25.

As specific values of the dimensions of the oil groove 25 of each of the configuration examples in the embodiment described above, examples thereof are described. However, other dimensional values may be used for the oil grooves 25.

Figure 36:
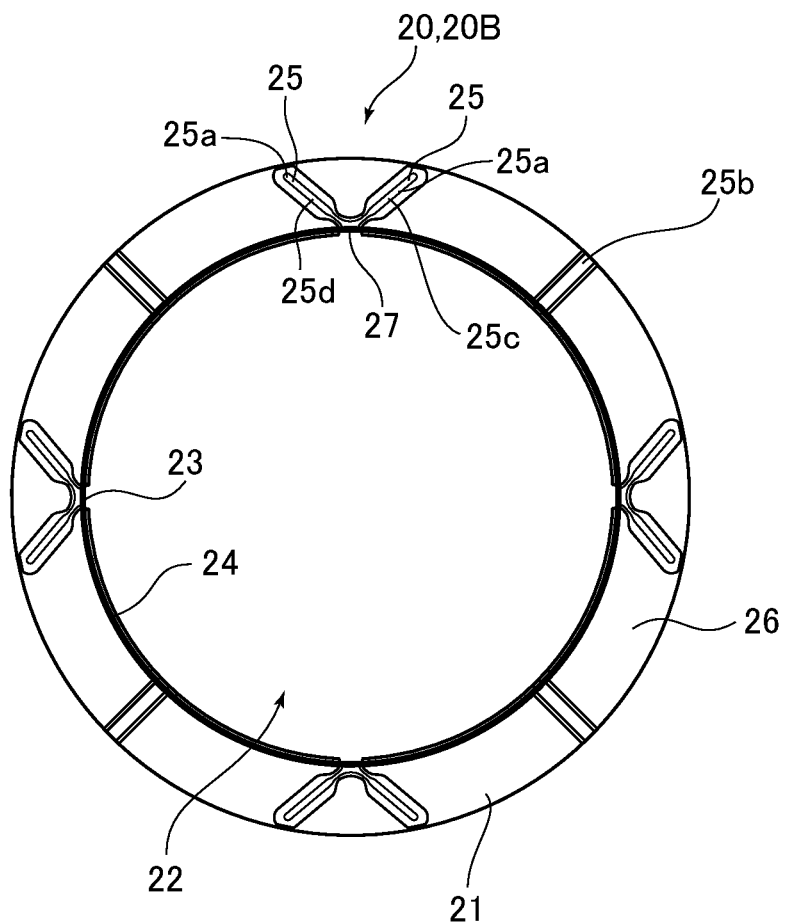
FIG. 36 is a plan view for illustrating a configuration of a resin thrust washer according to a modification example of a twelfth configuration example.
Figure 37:
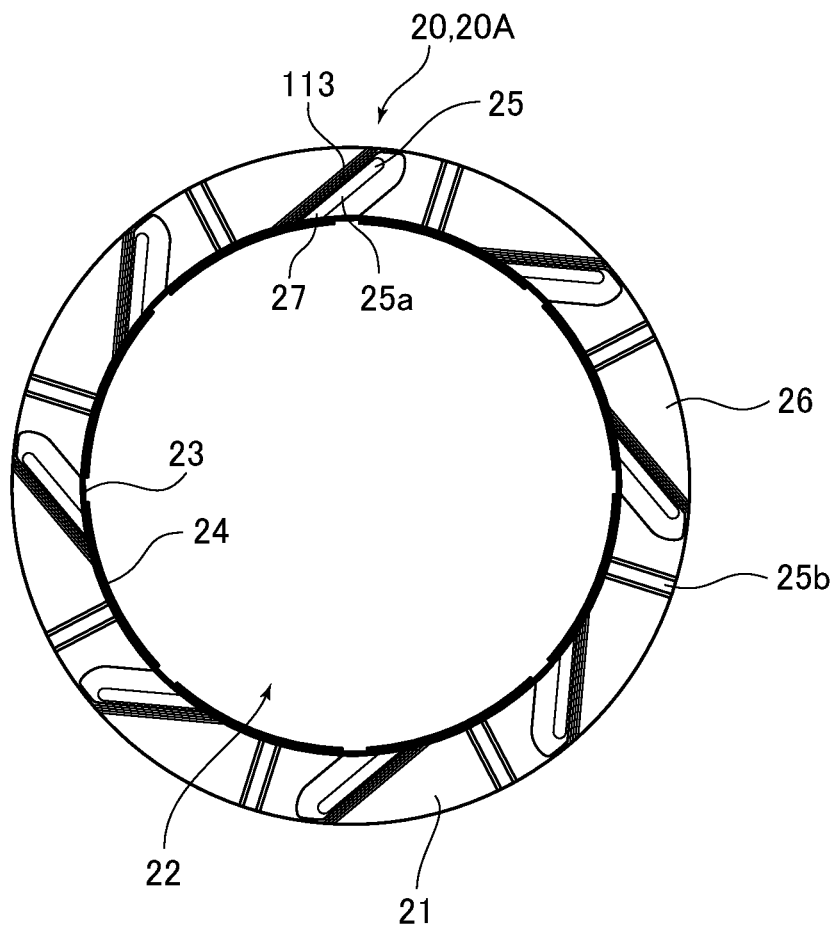
FIG. 37 is a plan view for illustrating a configuration of a resin thrust washer according to a modification example of a thirteenth configuration example.

Further, the oil grooves 25 in each of the embodiments described above may include both of the oil grooves 25 extending along the radial direction and the oil groove 25 inclined at a predetermined inclination angle with respect to the radial direction. Such a configuration example is illustrated in FIG. 36 and FIG. 37. The resin thrust washer 20B (twelfth configuration example) illustrated in FIG. 36 has the projecting curved-surface portions 256, the wide groove portions 257, and the narrow groove portions 258 as the eighth configuration example illustrated in FIG. 25 and FIG. 26. Further, the communicating oil groove 25b is formed in a region between one set of the first oil groove 25c and the second oil groove 25d. In other words, the communicating oil groove 25b (corresponding to an intermediate communicating oil groove) as illustrated in FIG. 36 is provided in the region between the first oil groove 25c and the second oil groove 25d, which are separate from each other (are not connected to each other at the opening portion 27).

In the configuration described above, the lubricating oil flows from the radially inner side to the radially outer side via the communicating oil grooves 25b, because the non-communicating oil grooves 25a and the communicating oil grooves 25b communicating with an outside of the ring-shaped portion 21 without the oil stop walls 28 are provided. Thus, heat generated by the sliding of the resin thrust washer 20 can be released to the outside through the lubricating oil. Thus, the heat radiation property of the resin thrust washer 20 can be improved. As a result, melting of the resin thrust washer 20, which may be caused by heat accumulation in the resin thrust washer 20, can be prevented.

Further, the communicating oil groove 25b is arranged between the opening portions 27 adjacent to each other in the circumferential direction of the ring-shaped portion 21 without interfering with the first oil groove 25c or the second oil groove 25d. Thus, there can be achieved a configuration in which the non-communicating oil grooves 25a (first oil grooves 25c and second oil grooves 25d) configured to achieve a reduction in sliding load and the communicating oil grooves 25b configured to release the heat to the outside are formed in the sliding surface 26 in a well-balanced arrangement.

Further, each of the non-communicating oil grooves 25a has the wide groove portion 257 and the narrow groove portion 258 having a groove width smaller than a width of the wide groove portion 257, and the narrow groove portion 258 is connected to the opening portion 27. Further, the wide groove portion 257 is continuous with the wide groove portion 257, and is provided on the oil stop wall 28 side. With the arrangement described above, the sliding load can be suitably reduced.

Further, the communicating oil grooves 25b (intermediate communicating oil groove) which communicate with the outside of the ring-shaped portion 21 because of absence of the oil stop wall 28 are provided between the non-communicating oil grooves 25a (first oil groove 25c and second oil groove 25d) that are separate from each other. Thus, there can be achieved a configuration in which the non-communicating oil grooves 25a (first oil grooves 25c and second oil grooves 25d) configured to achieve a reduction in sliding load and the communicating oil grooves 25b configured to release the heat to the outside are provided on the sliding surface 26 in a well-balanced arrangement.

Further, the resin thrust washer 20A (thirteenth configuration example) illustrated in FIG. 37 has the sliding protrusions 112, the communicating oil grooves 113, and the dynamic-pressure guiding wall surfaces 254, as in the case of the resin thrust washer 20A according to the ninth configuration example which is illustrated in FIG. 27 and FIG. 28. Further, the communicating oil groove 25b is formed between the non-communicating oil grooves 25a adjacent to each other in the circumferential direction.

In the configuration described above, the non-communicating oil grooves 25a and the communicating oil grooves 25b are provided alternately in the circumferential direction of the ring-shaped portion 21. Thus, both of a reduction in sliding load and improvement of the heat radiation property can be achieved.

Further, the communicating oil grooves 25b are provided with the communicating oil groove 113 (adjacent communicating oil groove) provided adjacent to the non-communicating oil groove 25a and the communicating oil groove 25b (intermediate communicating oil groove) located between the non-communicating oil grooves 25a which are separate from each other. Accordingly, the heat radiation property of the resin thrust washer 20A can be further improved.

In FIG. 36, one communicating oil groove 25b is arranged between the opening portions 27 adjacent to each other in the circumferential direction of the ring-shaped portion 21 without interfering with the first oil groove 25c or the second oil groove 25d. However, two or more communicating oil grooves 25b may be arranged between the opening portions 27 adjacent to each other in the circumferential direction. Further, the communicating oil groove 25b may be eliminated at one or more positions, each being located between the opening portions 27 adjacent to each other in the circumferential direction. Further, the communicating oil grooves 25b may be regularly arranged in the circumferential direction, but may also be irregularly arranged in the circumferential direction. Further, in at least one of the configurations illustrated in FIG. 36 and FIG. 37, the dynamic-pressure guiding wall surfaces 254 may be eliminated.

In the present invention, the above-mentioned examples and dimensional examples are merely examples. Thus, it is apparent that examples and dimensional examples other than those described above may be encompassed in the present invention as long as the sliding area ratio (oil groove area ratio) is set to fall within the above-mentioned range.

The invention claimed is:
1. A thrust washer made of a material containing a resin and provided with a ring-shaped portion that surrounds an insertion hole, wherein
 a front surface and a back surface of the ring-shaped portion are formed as sliding surfaces respectively, each of the sliding surfaces being slidable with another member, and the thrust washer is provided with at least one oil groove on at least one of the front surface and the back surface, the at least one oil groove being recessing from the sliding surface where the at least one oil groove is provided and being configured to allow lubricating oil to flow in;
 a hole penetrating through the ring-shaped portion is not formed and a space between the front surface and the back surface of the ring-shaped portion is blocked by the ring-shaped portion, the at least one oil groove is provided with an opening portion in an inner peripheral end side of the ring-shaped portion, the opening portion being recessed from the sliding surface and configured to allow the lubricating oil to flow in from the insertion hole side;

an outer periphery end side of the ring-shaped portion of an oil groove of the at least one oil groove is provided with an oil stop wall which is configured to separate the oil groove and an outside of the ring-shaped portion and suppress flow of the lubricating oil flowed into the oil groove toward an outer periphery side of the ring-shaped portion, the position of the oil stop wall in a thickness direction of the thrust washer is the same as that of sliding surface, and a sliding area ratio of each of the sliding surfaces to a projection plane in plan view of the ring-shaped portion is provided within a range of from 60% to 85%.

2. The thrust washer according to claim 1, wherein at an intersection position where a center line of the oil groove and a middle line in a radial direction of the ring-shaped portion intersect with each other, an inclination angle of a center line of the oil groove with respect to a radial line passing through the intersection position and extending along the radial direction of the ring-shaped portion is provided within a range of from 30 degrees to 55 degrees.

3. The thrust washer according to claim 1, wherein a dynamic-pressure guiding wall surface is provided being adjacent to the at least one oil groove, the dynamic-pressure guiding wall surface guiding the lubricating oil flowed into the at least one oil groove toward the sliding surface and generating dynamic pressure between the sliding surface and another member.

4. The thrust washer according to claim 1, wherein the at least one oil groove includes a plurality of oil grooves, the plurality of oil grooves including a first oil groove being inclined to one side with respect to a radial direction of the ring-shaped portion and a second oil groove being inclined to another side different from the one side with respect to the radial direction of the ring-shaped portion, and the first oil groove and the second oil groove are connected at the opening portion.

5. The thrust washer according to claim 4, wherein each of the first oil groove and the second oil groove has a bottom portion which is most recessed from the sliding surface, when the area surrounded by the first oil groove and the second oil groove which are connected by the opening portion is an inner side in the width direction of the first oil groove and in the width direction of the second oil groove, each of the first oil groove and the second oil groove which is connected at the opening portion is provided with a tapered wall surface being linearly inclined toward the sliding surface at a position which is positioned in the inner side and an opposite outer side in the width direction of the first oil groove, and at a position which is positioned in the inner side and the opposite outer side in the width direction of the second oil groove, and each of the tapered wall surface is provided to have a width larger than a width of the bottom portion.

6. The thrust washer according to claim 5, wherein each of the first oil groove and the second oil groove is provided with a curved wall surface which extends from the bottom portion toward the sliding surface and is curved.

7. The thrust washer according to claim 4, wherein the plurality of oil grooves are provided, including non-communicating oil grooves and communicating oil grooves, the non-communicating oil grooves each separated from the outside of the ring-shaped portion by the oil stop wall, the non-communicating oil grooves including the first oil groove and the second oil groove, and the communicating oil grooves each communicating with the outside of the ring-shaped portion because of absence of the oil stop wall, and the communicating oil grooves are arranged in regions between the opening portions of the non-communicating oil grooves being adjacent to each other in a circumferential direction of the ring-shaped portion without interfering with the first oil grooves or the second oil grooves of the non-communicating oil grooves.

8. The thrust washer according to claim 7, wherein at least one of the non-communicating oil grooves has a wide groove portion and a narrow groove portion having a groove width smaller than a width of the wide groove portion, the narrow groove portion is connected to the opening portion, and the wide groove portion is continuous with the narrow groove portion and is provided on the oil stop wall side.

9. The thrust washer according to claim 8, wherein at least one of the communicating oil grooves is placed as an intermediate communicating oil groove between the non-communicating oil grooves that are separate from each other.

10. The thrust washer according to claim 1, wherein the at least one oil groove includes a plurality of oil grooves provided on at least one of the front surface and the back surface, including at least one non-communicating oil groove of the plurality of oil grooves separated from the outside of the ring-shaped portion by the oil stop wall and at least one communicating oil groove of the plurality of oil grooves communicating with the outside of the ring-shaped portion because of absence of the oil stop wall.

11. The thrust washer according to claim 10, wherein a plurality of the non-communicating oil grooves and a plurality of the communicating oil grooves are provided alternately in a circumferential direction of the ring-shaped portion.

12. The thrust washer according to claim 10, wherein a plurality of the communicating oil grooves and a plurality of the non-communicating oil grooves are provided, the plurality of communicating oil grooves including at least one adjacent communicating oil groove adjacent to corresponding one of the non-communicating oil grooves and at least one intermediate communicating oil groove located between corresponding two of the non-communicating oil grooves that are separate from each other.

13. The thrust washer according to claim 1, wherein an oil scooping surface which is configured to guide the lubricating oil to the opening portion is provided on an inner periphery side of the ring-shaped portion, the oil scooping surface is provided in such a manner as to be inclined with respect to an axial direction of the ring-shaped portion, and the opening portion is configured by recessing the oil scooping surface.

14. The thrust washer according to claim 13, wherein a height from an inner peripheral end portion of the oil scooping surface to the sliding surface is provided with a dimension two or more times a height from a bottom portion of the at least one oil groove which is most recessed in the oil groove with respect to the sliding surface to the sliding surface.

15. The thrust washer according to claim 13, wherein the ring-shaped portion is provided with an oil introducing groove that is concaved from a radially inner side to a radially outer side of the ring-shaped portion,
an inclination angle of a groove bottom portion of the oil introducing groove with respect to an axial direction of the ring-shaped portion is provided smaller than an inclination angle of the oil scooping surface with respect to the axial direction, and
the oil introducing groove and the oil scooping surface have a level difference.

16. The thrust washer according to claim 15, wherein at least a part of a boundary wall of the oil introducing groove, which is located between the oil introducing groove and the oil scooping surface, is formed in such a manner as to be inclined with respect to a radial direction of the ring-shaped portion.

* * * * *